United States Patent
Kajiyama et al.

(10) Patent No.: US 11,316,433 B2
(45) Date of Patent: Apr. 26, 2022

(54) POWER CONVERSION DEVICE INCLUDING FIRST AND SECOND BRIDGE CIRCUITS

(71) Applicant: Mitsubishi Electric Corporation, Chiyoda-ku (JP)

(72) Inventors: Takuya Kajiyama, Chiyoda-ku (JP); Takaharu Ishibashi, Chiyoda-ku (JP); Takushi Jimichi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 15 days.

(21) Appl. No.: 16/965,411

(22) PCT Filed: Mar. 2, 2018

(86) PCT No.: PCT/JP2018/008104
§ 371 (c)(1),
(2) Date: Jul. 28, 2020

(87) PCT Pub. No.: WO2019/167271
PCT Pub. Date: Sep. 6, 2019

(65) Prior Publication Data
US 2020/0389095 A1 Dec. 10, 2020

(51) Int. Cl.
*H02M 3/335* (2006.01)
*H02M 1/40* (2007.01)
*H02M 3/156* (2006.01)

(52) U.S. Cl.
CPC ......... *H02M 3/33576* (2013.01); *H02M 1/40* (2013.01); *H02M 3/156* (2013.01)

(58) Field of Classification Search
None
See application file for complete search history.

(56) References Cited

U.S. PATENT DOCUMENTS

| 5,450,310 A * | 9/1995 | Kawakami | G05F 1/44 363/27 |
| 9,178,437 B2 * | 11/2015 | Rosado | H02M 3/33507 |
| 9,496,797 B2 * | 11/2016 | Panov | H02M 1/40 |

FOREIGN PATENT DOCUMENTS

JP 2013-99194 A 5/2013

OTHER PUBLICATIONS

Dutta et al., "A method to measure the dc bias in high frequency isolation transformer of the dual active bridge dc to dc converter and its removal using current injection and pwm switching", 2014, IEEE, pp. 1134-1139 (Year: 2014).*

(Continued)

*Primary Examiner* — Jeffrey A Gblende
(74) *Attorney, Agent, or Firm* — Xsensus LLP

(57) ABSTRACT

A power conversion device includes a first bridge circuit, a second bridge circuit, and an inductance element connected between a first AC terminal of the first bridge circuit and a second AC terminal of the second bridge circuit. The controller calculates a passing current passing through the inductance element based on a difference between a first alternating current flowing between the first AC terminal and the inductance element and a second alternating current flowing between the second AC terminal and the inductance element, and detects a first DC component included in the passing current. The controller changes a duty in at least one of the first AC voltage and the second AC voltage to cancel the detected first DC component, the duty being a ratio of a positive potential period and a negative potential period.

15 Claims, 17 Drawing Sheets

(56) References Cited

OTHER PUBLICATIONS

International Search Report dated Apr. 10, 2018 in PCT/JP2018/008104 filed on Mar. 2, 2018, 1 page.
Extended European Search Report dated Feb. 3, 2021 in European Patent Application No. 18907558.3, 9 pages.
Sumit Dutta, et al., "A Method to Measure the DC Bias in High Frequency Isolation Transformer of the Dual Active Bridge DC to DC Converter and its Removal Using Current Injection and PWM Switching", 2014 IEEE Energy Conversion Congress and Exposition, Sep. 14, 2014, XP032680692, 6 pages.
Yuri Panov, et al., "Transformer-Flux-Balancing Control in Isolated Bidirectional DC-DC Converters", 2014 IEEE Applied Power Electronics Conference and Exposition, Mar. 16, 2014, XP032591160, 8 pages.
Office Action dated Sep. 24, 2021, in corresponding European patent Application No. 18907558.3, 6 pages.

* cited by examiner (D)

(E)

(F)

(A)

(B)

(C)

(D)

(E)

(F)

POWER CONVERSION DEVICE INCLUDING FIRST AND SECOND BRIDGE CIRCUITS

TECHNICAL FIELD

The present disclosure relates to a power conversion device for converting DC power into DC power.

BACKGROUND ART

In photovoltaic power generation systems, power storage systems, or the like, DC/DC converters capable of bidirectionally supplying DC power have been widely used. One of such bidirectional DC/DC converters is a DAB (Dual Active Bridge) type DC/DC converter (see, for example, U.S. Pat. No. 9,496,797 (PTL 1) and Japanese Patent Laying-Open No. 2013-99194 (PTL 2)).

The DAB type DC/DC converter has a circuit configuration in which two full bridge circuits are connected to each other via an inductance element such as a reactor or a transformer. With such a symmetry of the circuit configuration, a feature of the DAB type DC/DC converter lies in that characteristics are equal in bidirectional power transfers. Hence, the DAB type DC/DC converter is suitable for applications involving a large amount of power.

In the DAB type DC/DC converter, each bridge circuit has a first leg and a second leg connected in parallel. Each leg is formed by connecting, in series, a switching element included in an upper arm and a switching element included in a lower arm. By complementarily switching the upper arm and the lower arm in each leg and by switching the first leg and the second leg basically at a phase difference of 180°, a square wave voltage can be generated at each of primary and secondary sides of the inductance element. Transfer power can be adjusted by controlling a phase difference between the bridge circuits. There has also been proposed a configuration in which a phase difference is provided between the switching operations of the first leg and the second leg.

However, due to a variation in characteristics of the switching elements included in each bridge circuit, a variation in switching timings, or the like, a DC component may remain in a voltage output from each bridge circuit. When such a voltage including a DC component is applied to an inductance element, DC biased magnetization occurs in the inductance element, disadvantageously. When such DC biased magnetization occurs in the inductance element, an overcurrent flows to presumably result in damage of the DC/DC converter.

In order to solve such a problem, for example, PTL 1 describes a DC/DC converter having: a primary current feedback control loop for controlling a primary side current; and a secondary current feedback control loop for controlling an excitation current.

On the other hand, PTL 2 describes a DC/DC converter configured to: calculate a pulse correction amount for canceling biased magnetization based on a primary side current; and determine, based on a direction of a secondary side current, whether an operation is being performed in a power running mode or a regeneration mode. In PTL 2, a control mode is switched in accordance with the determined mode, and a pulse command for a switching element selected based on the control mode to be corrected is corrected based on the above-described pulse correction amount, thereby canceling the biased magnetization.

CITATION LIST

Patent Literature

PTL 1: U.S. Pat. No. 9,496,797
PTL 2: Japanese Patent Laying-Open No. 2013-99194

SUMMARY OF INVENTION

Technical Problem

However, in the technique described in PTL 2, since the control mode needs to be switched whenever switching is made between the power running and the regeneration, the control may become complicated.

Moreover, in each of the techniques described in PTL 1 and PTL 2, one bridge circuit performs control for the primary side current and the other bridge circuit performs control for the excitation current. Hence, an effect of suppressing DC biased magnetization of a main current may be unable to be obtained.

The present invention has been made to solve such problems, and has an object to suppress occurrence of DC biased magnetization in an inductance element in a power conversion device including a DAB type DC/DC converter.

Solution to Problem

A power conversion device according to the present disclosure is configured to perform power conversion between a first DC voltage and a second DC voltage. The power conversion device includes: a first bridge circuit to convert the first DC voltage into a first AC voltage and output the first AC voltage to a first AC terminal; a second bridge circuit to convert the second DC voltage into a second AC voltage and output the second AC voltage to a second AC terminal; an inductance element connected between the first AC terminal and the second AC terminal; and a controller to control the voltage conversion in each of the first and second bridge circuits. The controller calculates a passing current passing through the inductance element based on a difference between a first alternating current flowing between the first AC terminal and the inductance element and a second alternating current flowing between the second AC terminal and the inductance element. The controller detects a first DC component included in the passing current. The controller changes a duty in at least one of the first AC voltage and the second AC voltage to cancel the detected first DC component, the duty being a ratio of a positive potential period and a negative potential period.

Advantageous Effects of Invention

According to the present disclosure, in the power conversion device including the DAB type DC/DC converter, it is possible to suppress occurrence of DC biased magnetization in the inductance element.

DESCRIPTION OF EMBODIMENTS

Figure 1:
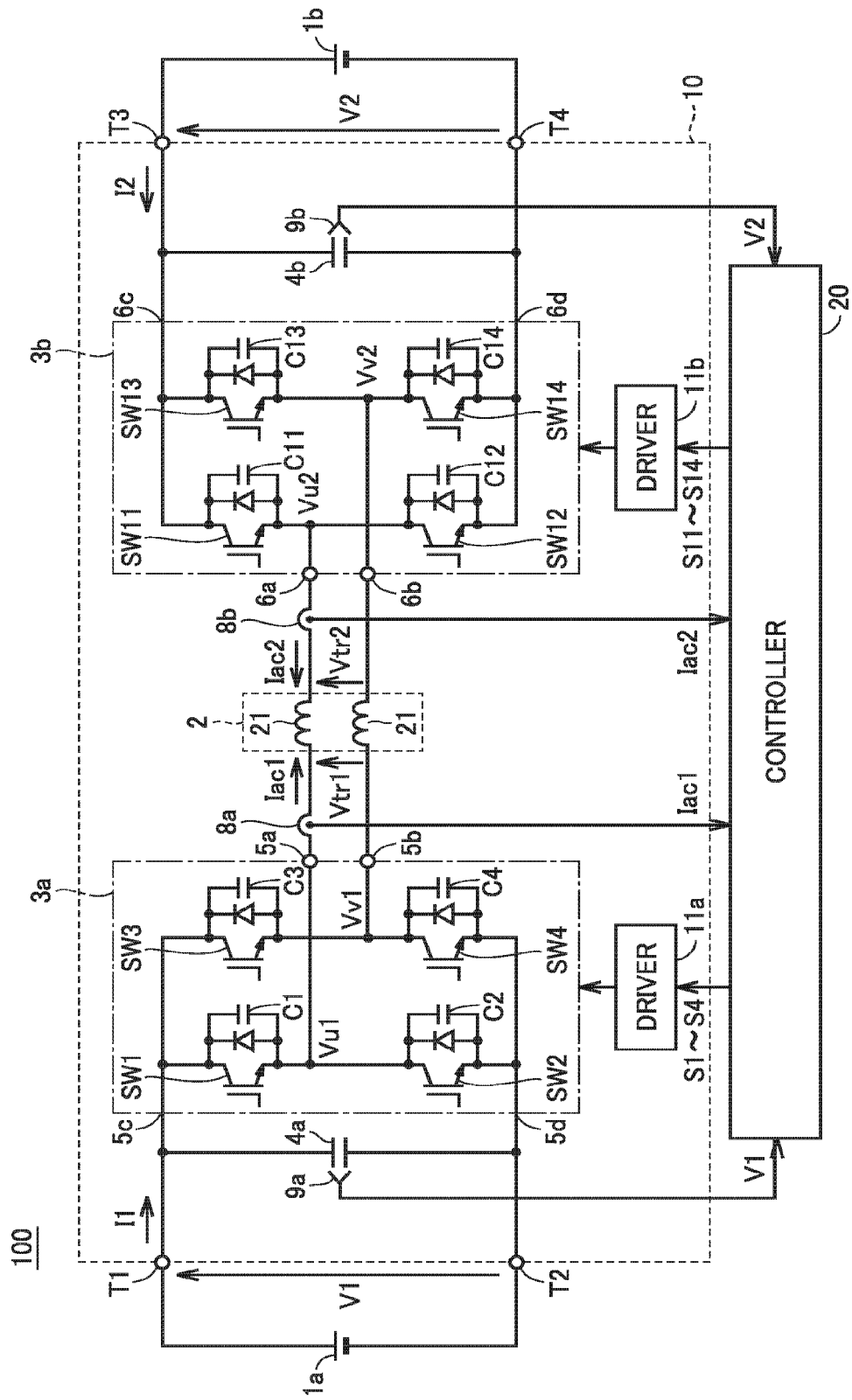
FIG. 1 is a schematic diagram of a main circuit of a power conversion device according to a first embodiment.

The following describes embodiments of the present invention in detail with reference to figures. It should be noted that in the description below, the same or corresponding portions in the figures are given the same reference characters and will not be described repeatedly in principle.

First Embodiment

First, an overall configuration of a power conversion device according to a first embodiment will be described. FIG. 1 is a schematic diagram of a main circuit of a power conversion device 100 according to the first embodiment.

Referring to FIG. 1, power conversion device 100 according to the first embodiment includes a DC/DC converter 10 and a controller 20. DC/DC converter 10 performs bidirectional power conversion between a primary side DC voltage V1 (first DC voltage) and a secondary side DC voltage V2 (second DC voltage).

DC/DC converter 10 is a DAB type DC/DC converter, and includes a primary side bridge circuit 3a, a secondary side bridge circuit 3b, an inductance element 2, capacitors 4a, 4b, and drivers 11a, 11b. DC/DC converter 10 further includes DC terminals T1 to T4, current detectors 8a, 8b, and voltage detectors 9a, 9b.

DC/DC converter 10 is connected between a primary side DC power supply 1a and a secondary side DC power supply 1b. DC power supply 1a is connected to DC terminals T1, T2, and DC power supply 1b is connected to DC terminals T3, T4. DC power supply 1a generates DC power. DC/DC converter 10 converts the DC power supplied from DC power supply 1a and supplies the converted DC power to DC power supply 1b. DC power supply 1b includes a power storage device for storing DC power. The power storage device is, for example, a secondary battery, an electric double layer capacitor, or the like. Further, DC/DC converter 10 can transfer, to DC power supply 1a, the DC power supplied from DC power supply 1b.

Primary side bridge circuit 3a includes AC terminals 5a, 5b and DC terminals 5c, 5d. DC terminal 5c of primary side bridge circuit 3a is connected to DC terminal T1, and DC terminal 5d of primary side bridge circuit 3a is connected to DC terminal T2.

Capacitor 4a is connected between DC terminals 5c, 5d of primary side bridge circuit 3a, and smoothes DC voltage V1 (primary side DC voltage) between DC terminals 5c, 5d. Voltage detector 9a detects primary side DC voltage V1 and provides a signal indicating the detected value to controller 20.

Primary side bridge circuit 3a is driven in accordance with a gate signal output from driver 11a, converts primary side DC voltage V1 into an AC voltage Vtr1 (hereinafter, also referred to as "primary side AC voltage"), and outputs AC voltage Vtr1 between AC terminals 5a, 5b. Primary side bridge circuit 3a includes switching elements SW1 to SW4 and capacitors C1 to C4 respectively connected to switching elements SW1 to SW4 in parallel. Switching elements SW1, SW2 are connected in series between DC terminals T1 and T2. A connection point between switching elements SW1 and SW2 is connected to AC terminal 5a. Switching elements SW3, SW4 are connected in series between DC terminals T1 and T2. A connection point between switching elements SW3 and SW4 is connected to AC terminal 5b. Switching elements SW1 to SW4 are turned on or off in accordance with control signals S1 to S4 supplied from controller 20, respectively.

Secondary side bridge circuit 3b includes AC terminals 6a, 6b and DC terminals 6c, 6d. DC terminal 6c of secondary side bridge circuit 3b is connected to DC terminal T3, and DC terminal 6d of secondary side bridge circuit 3b is connected to DC terminal T4.

Capacitor 4b is connected between DC terminals 6c, 6d of secondary side bridge circuit 3b, and smoothes DC voltage V2 (secondary side DC voltage) between DC terminals 6c, 6d. Voltage detector 9b detects secondary side DC voltage V2 and provides a signal indicating the detected value to controller 20.

Secondary side bridge circuit 3b is driven in accordance with a gate signal output from driver 11b, converts secondary side DC voltage V2 into an AC voltage Vtr2 (hereinafter, also referred to as "secondary side AC voltage"), and outputs AC voltage Vtr2 between AC terminals 6a, 6b. Secondary side bridge circuit 3b includes switching elements SW11 to SW14, and capacitors C11 to C14 respectively connected to switching elements SW11 to SW14 in parallel. Switching elements SW11, SW12 are connected in series between DC terminals T3 and T4. A connection point between switching elements SW11 and SW12 is connected to AC terminal 6a. Switching elements SW13, SW14 are connected in series between DC terminals T3 and T4. A connection point between switching elements SW13 and SW14 is connected to AC terminal 6b. Switching elements SW11 to SW14 are turned on or off in accordance with control signals S11 to S14 supplied from controller 20, respectively.

Each of primary side bridge circuit 3a and secondary side bridge circuit 3b is constituted of a single-phase full bridge circuit. Primary side bridge circuit 3a corresponds to an embodiment of a "first bridge circuit", and secondary side bridge circuit 3b corresponds to an embodiment of a "second bridge circuit". In the description below, each switching element in the single-phase full bridge circuit may be referred to as an "arm". In particular, a switching element at the high-voltage side with respect to its connection point may be referred to as an "upper arm", and a switching element at the low-voltage side with respect to its connection point may be referred to as a "lower arm".

Each of switching elements SW1 to SW4 and SW11 to SW14 includes a power semiconductor switching element and a diode (Freewheeling Diode) connected to the semiconductor switching element in antiparallel. The semiconductor switching element is a self-turn-off type semiconductor switching element such as an IGBT (Insulated Gate Bipolar), a MOSFET (Metal-Oxide-Semiconductor Field Effect Transistor), or a GCT (Gate Commutated Turn-off) thyristor. The semiconductor switching element is not limited to an element composed of Si. For the semiconductor switching element, there may be used an element (a SiC-MOSFET or a GaN-HEMT (High Electron Mobility Transistor)) composed of a wide bandgap semiconductor such as SiC or GaN. For the diode, a parasitic diode of the semiconductor switching element may be used. Each of capacitors C11 to C4 and C11 to C14 may be an external capacitor. Alternatively, a parasitic capacitance of a switching element at an equivalent position in the circuit configuration may be used therefor.

Inductance element 2 is connected between AC terminal 5a of primary side bridge circuit 3a and AC terminal 6a of secondary side bridge circuit 3b and is connected between AC terminal 5b of primary side bridge circuit 3a and AC terminal 6b of secondary side bridge circuit 3b. Inductance element 2 includes: a reactor 25 connected between AC terminal 5a and AC terminal 6a; and a reactor 25 connected between AC terminal 5b and AC terminal 6b. Each of reactors 25 corresponds to an embodiment of an "inductance element". In the example of FIG. 1, inductance element 2 includes two reactors 25, but may include only one of reactors 25.

Current detector 8a is connected between AC terminal 5a and reactor 25, detects alternating current Iac1 (hereinafter also referred to as "primary side alternating current") flowing between primary side bridge circuit 3a and reactor 25, and provides a signal indicating the detected value to controller 20. Current detector 8b is connected between AC terminal 5b and reactor 25, detects alternating current Iac2 (hereinafter also referred to as "secondary side alternating current") flowing between secondary side bridge circuit 3b and reactor 25, and provides a signal indicating the detected value to controller 20.

Controller 20 generates control signals S1 to S4 for primary side bridge circuit 3a and control signals S11 to S14 for secondary side bridge circuit 3b based on instructions from a high-level controller (not shown) and output signals of current detectors 8a, 8b and voltage detectors 9a, 9b. Controller 20 is constituted of, for example, a microcomputer. As an example, controller 20 includes a memory and a CPU (Control Processing Unit), which are not shown in the figures. Controller 20 can perform a below-described control operation by way of software processing in which the CPU executes a program stored in advance in the memory. Alternatively, instead of the software processing, part or whole of the control operation may be implemented by way of hardware processing using a built-in dedicated electronic circuit or the like.

Driver 11a amplifies control signals S1 to S4 for primary side bridge circuit 3a and respectively supplies them to switching elements SW1 to SW4 of primary side bridge circuit 3a. Driver 11b amplifies control signals S11 to S14 for secondary side bridge circuit 3b and respectively supplies them to switching elements SW11 to SW14 of secondary side bridge circuit 3b.

Next, an operation of power conversion device 100 according to the first embodiment will be described with reference to FIG. 2 to FIG. 4.

Figure 2:
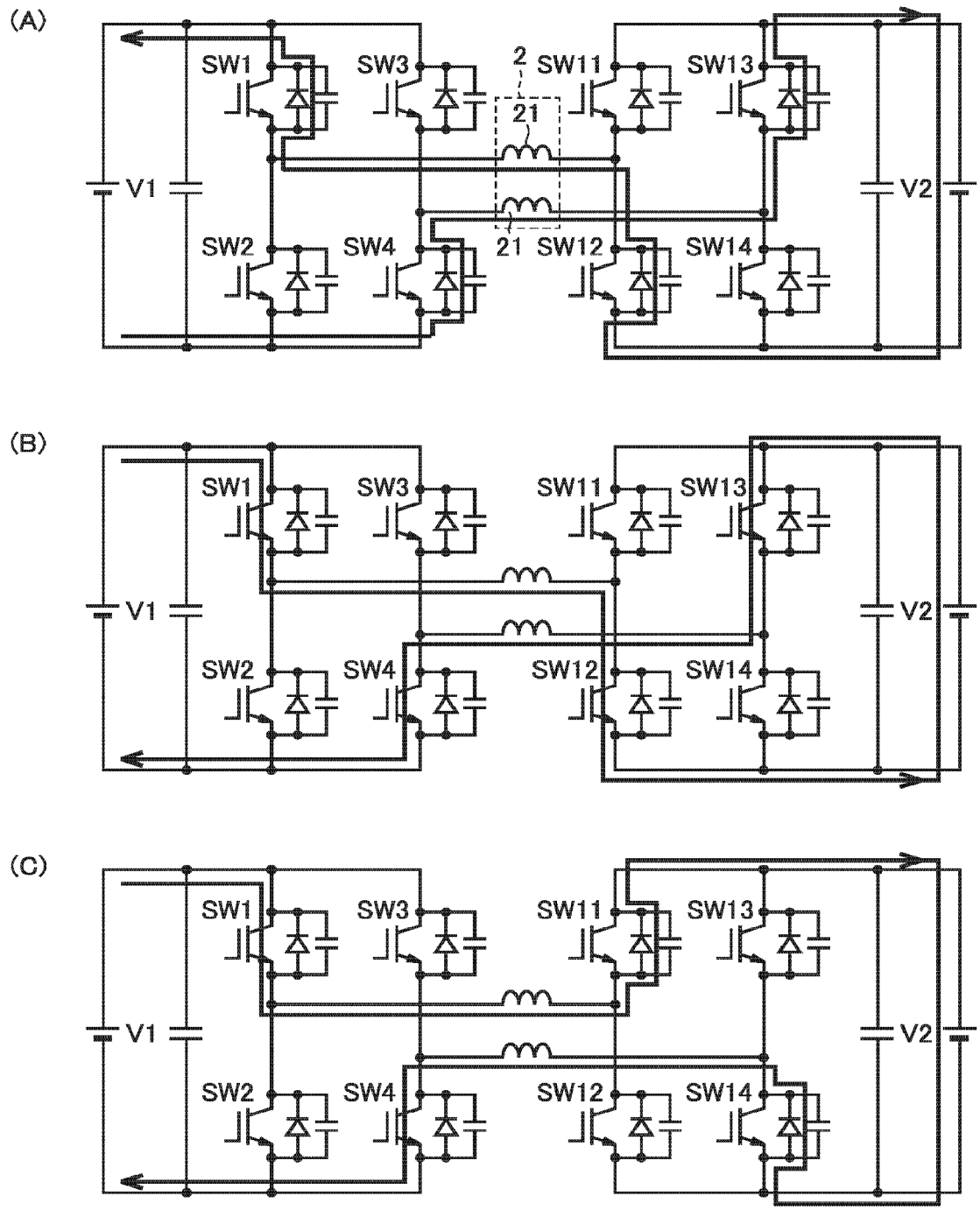
FIG. 2 is a diagram for illustrating a current path when power is transferred from a DC power supply 1a to a DC power supply 1b.
Figure 3:
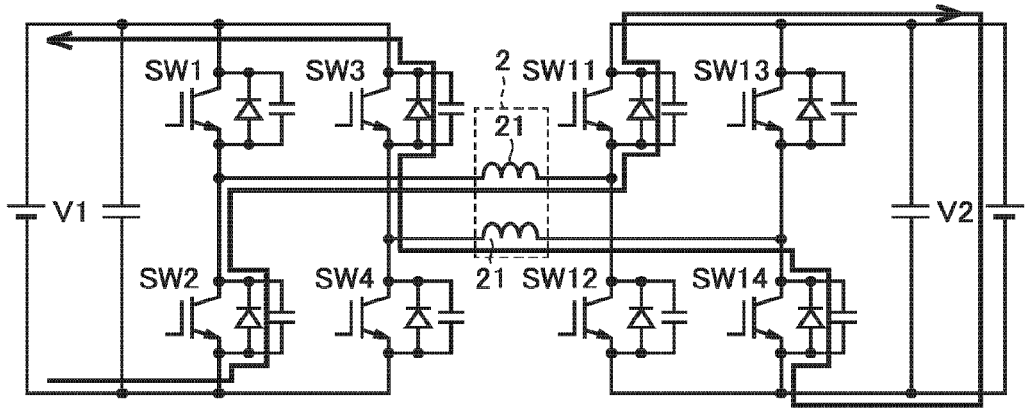
FIG. 3 is a diagram for illustrating a current path when power is transferred from DC power supply 1a to DC power supply 1b.
Figure 3:
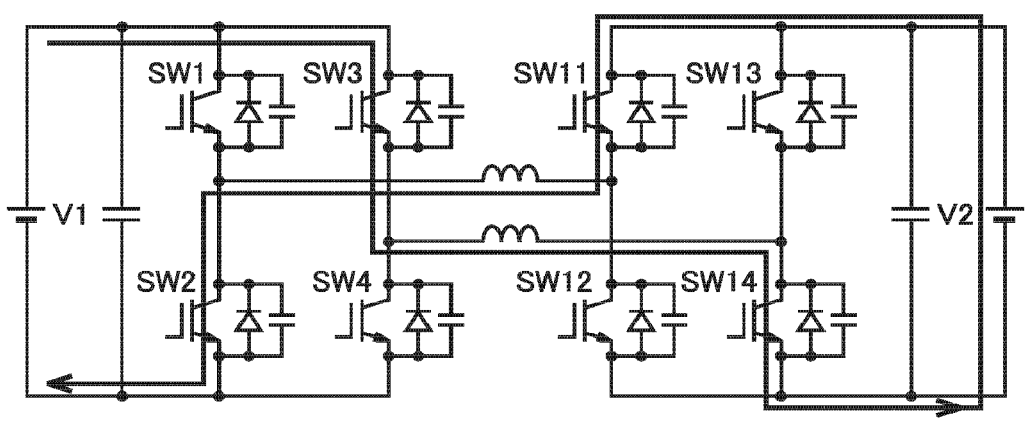
Figure 3:
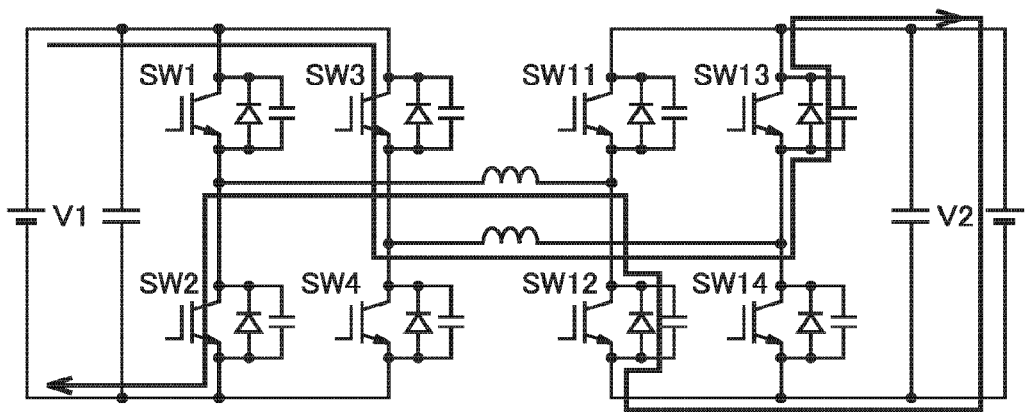

Each of FIG. 2 and FIG. 3 is a diagram for illustrating a current path when power is transferred from DC power supply 1a to DC power supply 1b. FIG. 4 is a diagram showing temporal changes in primary side AC voltage Vtr1, secondary side AC voltage Vtr2, and a current flowing through inductance element 2 in each of states (A) to (F) of DC/DC converter 10 shown in FIG. 2 and FIG. 3.

Figure 4:
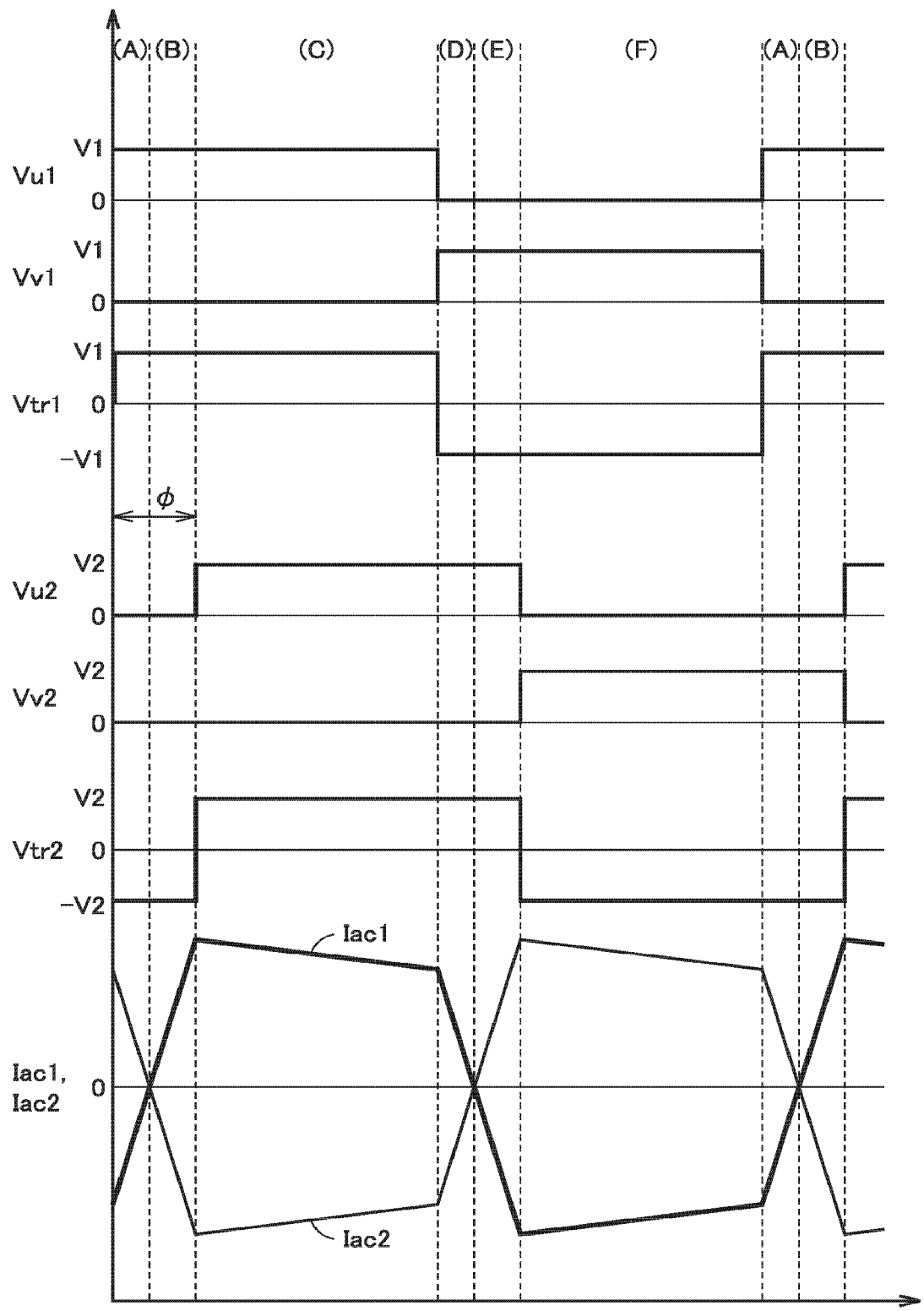
FIG. 4 is a diagram showing temporal changes in a primary side AC voltage, a secondary side AC voltage, and a current flowing through an inductance element in each of states of the DC/DC converter shown in FIG. 2 and FIG. 3.

In FIG. 4, Vu1 represents a drain-source voltage of switching element SW2, and Vv1 represents a drain-source voltage of switching element SW4. Vu2 represents a drain-source voltage of switching element SW12, and Vv2 represents a drain-source voltage of switching element SW14. Vu1, Vv1, Vu2, and Vv2 depend on respective ON times of the upper arms. A phase difference between Vu1 and Vv1 is 180° and a phase difference between Vu2 and Vv2 is 180°.

In the description below, regarding a direction of primary side alternating current Iac1, a direction of flow from primary side bridge circuit 3a to inductance element 2 is regarded as a positive direction. Regarding a direction of secondary side alternating current Iac2, a direction of flow from secondary side bridge circuit 3b to inductance element 2 is regarded as a positive direction.

FIG. 2 (A) shows a flow of current immediately after switching elements SW2, SW3 of primary side bridge circuit 3a are turned off and switching elements SW1, SW4 are turned on. Switching elements SW1, SW4, SW12, SW13 are in the ON state, and switching elements SW2, SW3, SW11, SW14 are in the OFF state. Since primary side alternating current Iac1 flows in a negative direction from reactor 25 to primary side bridge circuit 3a before switching element SW1 of primary side bridge circuit 3a is turned on and switching element SW2 is turned off, primary side alternating current Iac1 continues to flow in the same direction. On this occasion, secondary side alternating current Iac2 continues to flow in the positive direction from secondary side bridge circuit 3b to reactor 25.

After the state shown in FIG. 2 (A), a voltage is applied from DC power supply 1a to inductance element 2 to cause a current opposite to primary side alternating current Iac1, so that the magnitude of primary side alternating current Iac1 is decreased. Then, as shown in FIG. 2 (B), the direction of primary side alternating current Iac1 is reversed.

After the state shown in FIG. 2 (B), in secondary side bridge circuit 3b, switching elements SW12, SW13 are turned off, and switching elements SW11, SW14 are turned on. A switching state of secondary side bridge circuit 3b is reversed to be a state shown in FIG. 2 (C). In the state shown in FIG. 2 (C), power is transferred from DC power supply 1a to DC power supply 1b.

After the state shown in FIG. 2 (C), in primary side bridge circuit 3a, switching elements SW1, SW4 are turned off and switching elements SW2, SW3 are turned on, thus resulting in a state shown in FIG. 3 (D). Since primary side alternating current Iac1 have flown in the positive direction from primary side bridge circuit 3a to inductance element 2 in the state shown in FIG. 2 (C), primary side alternating current Iac1 continues to flow in the same direction in the state shown in FIG. 3 (D). On this occasion, secondary side alternating current Iac2 continues to flow in the negative direction from inductance element 2 to secondary side bridge circuit 3b.

After the state shown in FIG. 3 (D), a voltage is applied from DC power supply 1a to inductance element 2 to cause a current opposite to primary side alternating current Iac1, so that the magnitude of primary side alternating current Iac1 is decreased. Then, as shown in FIG. 3 (E), the direction of primary side alternating current Iac1 is reversed.

After the state shown in FIG. 3 (E), in secondary side bridge circuit 3b, switching elements SW11, SW14 are turned off, and switching elements SW12, SW13 are turned on. A switching state of secondary side bridge circuit 3b is reversed to be a state shown in FIG. 3 (F). In the state shown in FIG. 3 (F), power is transferred from DC power supply 1a to DC power supply 1b. After the state shown in FIG. 3 (F), in primary side bridge circuit 3a, switching elements SW1, SW4 are turned on and switching elements SW2, SW3 are turned off, thus resulting in a state shown in FIG. 2 (A).

In the temporal changes shown in FIG. 4, the states represented by (A) and (B) (see FIG. 2 (A) and FIGS. 2 (B)) and (D) and (E) (corresponding to FIG. 3 (D) and FIG. 3 (E)) correspond to an "excitation mode" in which inductance element 2 is excited, and the states represented by (C) and (F) (corresponding to FIG. 2 (C) and FIG. 3 (F)) correspond to a "transfer mode" in which power is transferred from DC power supply 1a to DC power supply 1b.

As such, in the exemplary operation of FIG. 2 and FIG. 3, in primary side bridge circuit 3a, switching elements SW1, SW2 are switched complementarily in a first leg including switching elements SW1, SW2, and switching elements SW3, SW4 are switched complementarily in a second leg including switching elements SW3, SW4. The first leg and the second leg are switched at a phase difference of 180°. In secondary side bridge circuit 3b, switching elements SW11, SW12 are switched complementarily in a third leg including switching elements SW11, SW12, and switching elements SW13 and SW14 are switched complementarily in a fourth leg including switching elements SW13, SW14. The third leg and the fourth leg are operated at a phase difference of 180°. By adjusting a phase difference φ in switching period between primary side bridge circuit 3a and secondary side bridge circuit 3b, power supplied from DC power supply 1a can be converted and then can be transferred to DC power supply 1b. It should be noted that the two legs are basically switched at a phase difference of 180° in each of the bridge circuits; however, there may be employed a configuration in which a phase difference is provided between the switching operations of the two legs.

As shown in FIG. 4, each of primary side AC voltage Vtr1 and secondary side AC voltage Vtr2 is a square wave voltage. In the present specification, a ratio of a positive potential period to a total of the positive potential period and a negative potential period in the square wave voltage is defined as a "duty d". In the exemplary configuration of FIG. 1, duty d in primary side AC voltage Vtr1 is defined as a "duty d1", and duty d in secondary side AC voltage Vtr2 is defined as a "duty d2". Duty d1 corresponds to a "first duty", and duty d2 corresponds to a "second duty".

In primary side bridge circuit 3a, the first and second switching element pairs are switched at a phase difference of 180°. Hence, duty d1 of primary side AC voltage Vtr1 becomes 0.5. Also in secondary side bridge circuit 3b, the third and fourth switching element pairs are switched at a phase difference of 180°. Hence, duty d2 of secondary side AC voltage Vtr2 becomes 0.5.

Here, when the positive potential period and the negative potential period are unbalanced in the AC voltage output to the AC terminal of each bridge circuit, that is, when duty d is deviated from 0.5, the AC voltage is positively and negatively asymmetrical, with the result that a DC component remains in the AC voltage. The DC component of the AC voltage is caused by a variation in characteristics of the switching elements included in each bridge circuit, a variation in turn-on and turn-off timings of the switching elements, or the like. When such an AC voltage including a DC component is applied to reactor 25 serving as inductance element 2, DC biased magnetization may occur in reactor 25.

The occurrence of DC biased magnetization in reactor 25 leads to an increased excitation current of reactor 25, with the result that a waveform of the AC voltage may be deteriorated. Otherwise, DC/DC converter 10 may be damaged due to an overcurrent flowing in reactor 25.

To address this, in power conversion device 100 according to the first embodiment, duty d is changed in at least one of primary side AC voltage Vtr1 and secondary side AC side voltage Vtr2 so as to cancel the DC biased magnetization in reactor 25.

Figure 5:
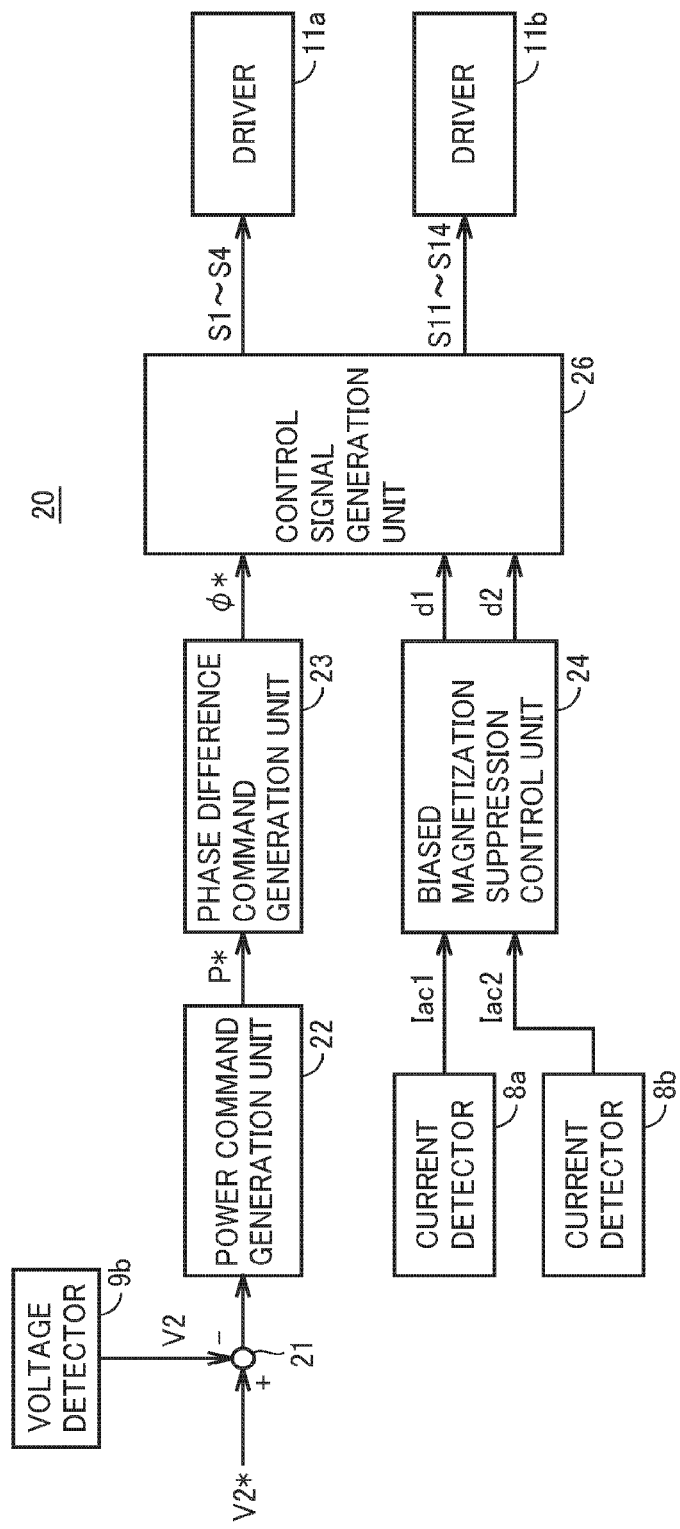
FIG. 5 is a block diagram showing portions of a controller associated with generation of control signals.

FIG. 5 is a block diagram showing portions of controller 20 associated with generation of control signals S1 to S4 and S11 to S14. It should be noted that FIG. 5 shows portions used when power is transferred between DC power supply 1a and DC power supply 1b. The following describes a case where controller 20 controls DC/DC converter 10 such that secondary side DC voltage V2 detected by voltage detector 9b follows a target voltage V2* for secondary side DC voltage V2. In this case, secondary side DC voltage V2 is controlled by power conversion device 100, and primary side DC voltage V1 is held at a certain value by DC power supply 1a connected to DC terminals T1, T2.

Referring to FIG. 5, controller 20 includes a subtractor 21, a power command generation unit 22, a phase difference command generation unit 23, a biased magnetization suppression control unit 24, and a control signal generation unit 26. Functions of the blocks shown in FIG. 5 can be implemented by at least one of software processing by controller 20 and hardware processing.

Subtractor 21 calculates a deviation (V2*−V2) between target voltage V2* supplied from the high-level controller and secondary side DC voltage V2 detected by voltage detector 9b. Power command generation unit 22 performs a control calculation to cause the deviation (V2*−V2) to be 0 such that secondary side DC voltage V2 detected by voltage detector 9b follows target voltage V2*, thereby generating a transmission power command value P*. The generated transmission power command value P* is supplied to phase difference command generation unit 23.

It should be noted that when controlling such that primary side DC voltage V1 follows target voltage V1* for primary side DC voltage V1, voltage detector 9b connected to phase difference command generation unit 23 is switched to voltage detector 9a by a switching circuit, for example. In this case, it is assumed that secondary side DC voltage V2 is held at a certain value by DC power supply 1b connected to DC terminals T3, T4. Power command generation unit 22 performs a control calculation to cause the deviation (V1*−V1) between target voltage V1* and primary side DC voltage V1 to be 0 such that primary side DC voltage V1 detected by voltage detector 9a follows target voltage V1* supplied from a high-level controller, thereby generating a transmission power command value P*.

Alternatively, the following configuration may be employed: primary side DC voltage V1 and secondary side DC voltage V2 are both held at predetermined values, and transmission power command value P* is directly supplied from a high-level controller to phase difference command generation unit 23.

Phase difference command generation unit 23 generates a phase difference command value ϕ* based on transmission power command value P* generated by power command generation unit 22. Generated phase difference command value ϕ* is supplied to control signal generation unit 26.

Biased magnetization suppression control unit 24 generates duty d1 in primary side bridge circuit 3a and duty d2 in secondary side bridge circuit 3b based on primary side alternating current Iac1 detected by current detector 8a and secondary side alternating current Iac2 detected by current detector 8b.

Figure 6:
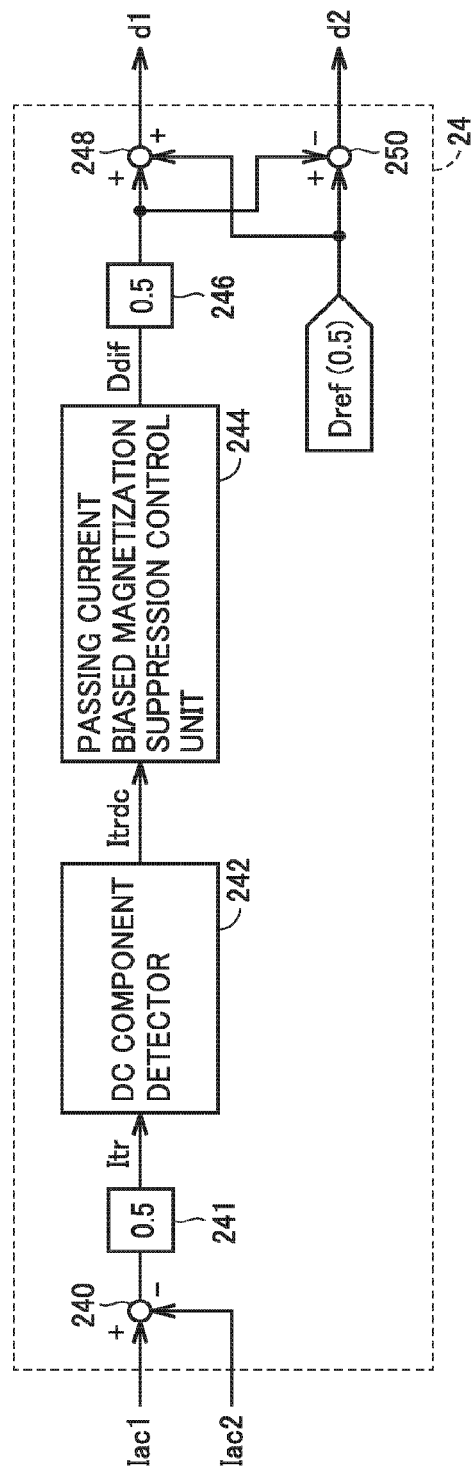
FIG. 6 is a block diagram showing a configuration of a biased magnetization suppression control unit shown in FIG. 5.

FIG. 6 is a block diagram showing a configuration of biased magnetization suppression control unit 24 shown in FIG. 5.

Referring to FIG. 6, biased magnetization suppression control unit 24 includes subtractors 240, 250, a DC component detector 242, a passing current biased magnetization suppression control unit 244, multipliers 241, 246, and an adder 248.

Subtractor 240 calculates a deviation (Iac1−Iac2) between primary side alternating current Iac1 detected by current detector 8a and secondary side alternating current Iac2 detected by current detector 8b. Multiplier 241 multiplies the deviation (Iac1−Iac2) by a coefficient of 0.5. The multiplied value, (Iac1−Iac2)×0.5, corresponds to a passing current Itr transferred from primary side bridge circuit 3a to secondary side bridge circuit 3b.

DC component detector 242 detects a DC component Itrdc included in passing current Itr. DC component Itrdc corresponds to a "first DC component". A detailed configuration of DC component detector 242 will be described later.

Here, when both primary side AC voltage Vtr1 and secondary side AC voltage Vtr2 represent ideal square waves (duty d=0.5), both primary side alternating current Iac1 and secondary side alternating current Iac2 have positively and negatively symmetrical waveforms as shown in FIG. 4. On the other hand, when at least one of primary side AC voltage Vtr1 and secondary side AC voltage Vtr2 includes a DC component, a corresponding alternating current is positively and negatively asymmetrical to include a DC component. Accordingly, DC component Itrdc also appears in passing current Itr flowing through inductance element 2, thus resulting in occurrence of DC biased magnetization in inductance element 2.

Passing current biased magnetization suppression control unit 244 performs a control calculation to cause DC component Itrdc detected by DC component detector 242 to be 0 so as to generate a difference (hereinafter referred to as a "duty difference command") Ddif between duty d1 of primary side bridge circuit 3a and duty d2 of secondary side bridge circuit 3b. Duty difference command Ddif corresponds to an embodiment of the "target deviation" between first duty d1 and second duty d2.

Multiplier 246 multiplies duty difference command Ddif by a coefficient of 0.5. Adder 248 adds an output (Ddif×0.5) of multiplier 246 to a reference duty Dref, thereby generating duty d1.

Subtractor 250 subtracts the output (Ddif×0.5) of multiplier 246 from reference duty Dref, thereby generating duty d2.

Here, reference duty Dref=0.5 is set. Duties d1, d2 are respectively given by the following formulas (1) and (2):

$$d1 = 0.5 + Ddif \times 0.5 \quad (1)$$

$$d2 = 0.5 - Ddif \times 0.5 \quad (2)$$

As can be understood from the formulas (1) and (2), the difference (d1−d2) between duty d1 and duty d2 is equal to duty difference command Ddif. It should be noted that in order to obtain duties d1, d2, FIG. 6 presents the exemplary configuration of adding and subtracting the value (Ddif×0.5) obtained by equally dividing duty difference command Ddif; however, the ratio of the added and subtracted values can be set appropriately. When the ratio of the added and subtracted values is k:(1−k) (where 0≤k≤1), duties d1, d2 are respectively given by the following formulas (3) and (4):

$$d1 = 0.5 + Ddif \times k \quad (3)$$

$$d2 = 0.5 - Ddif \times (1-k) \quad (4)$$

It should be noted that according to the formulas (3) and (4), Dref=0.5 can be set for one of duties d1, d2, and a value for the other of duties d1, d2 can be changed from Dref by duty difference command Ddif. That is, by changing at least one of duties d1, d2 to match the difference between duties d1 and d2 with duty difference command Ddif, DC component Itrdc can be canceled.

Figure 7:
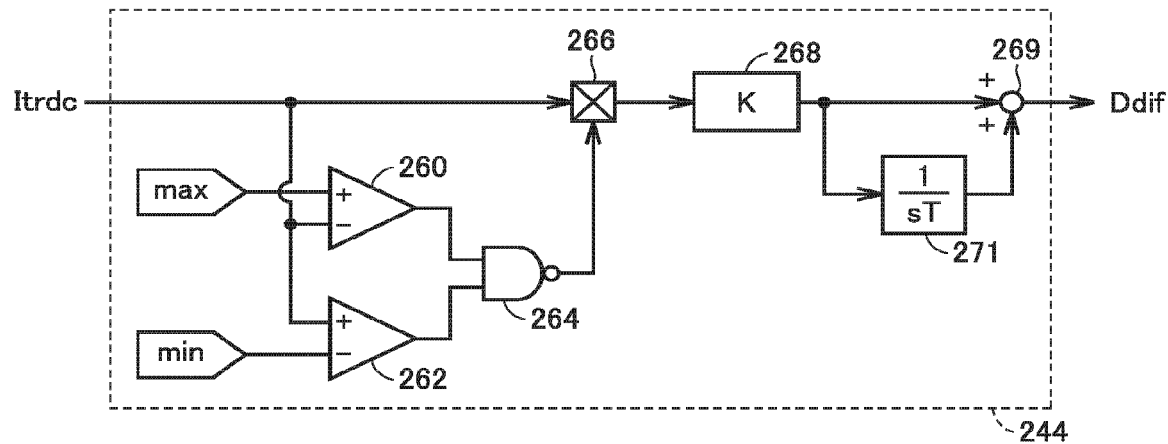
FIG. 7 is a block diagram showing an exemplary configuration of a passing current biased magnetization suppression control unit shown in FIG. 6.

FIG. 7 is a block diagram showing an exemplary configuration of passing current biased magnetization suppression control unit 244 shown in FIG. 6. Referring to FIG. 7, passing current biased magnetization suppression control unit 244 includes comparators 260, 262, a NAND circuit 264, a multiplier 266, a proportional unit 268, an integrator 271, and an adder 269.

Comparator 260 compares DC component Itrdc with an upper limit value max, and outputs a comparison result. When DC component Itrdc is smaller than upper limit value max, comparator 260 outputs a H (logic high) level signal. When DC component Itrdc is larger than upper limit value max, comparator 260 outputs an L (logic low) level signal.

Comparator 262 compares DC component Itrdc with a lower limit value min, and outputs a comparison result. When DC component Itrdc is larger than lower limit value min, comparator 262 outputs an H level signal. When DC component Itrdc is smaller than lower limit value min, comparator 262 outputs an L level signal.

NAND circuit 264 calculates a NAND of the output signal of comparator 260 and the output signal of comparator 262. When DC component Itrdc is more than upper limit value max or is less than lower limit value min, NAND circuit 264 outputs an H level signal (logical value of "1"). When DC component Itrdc is equal to or less than upper limit value max and equal to or more than lower limit value min, NAND circuit 264 outputs an L level signal (logical value of "0").

Multiplier 266 multiplies DC component Itrdc by the output signal of NAND circuit 264, and outputs a signal indicating the multiplication result to proportional unit 268. When the signal of NAND circuit 264 indicates a value of "1", multiplier 266 outputs DC component Itrdc. When the signal of NAND circuit 264 indicates a value of "0", multiplier 266 does not output DC component Itrdc.

Proportional unit 268, integrator 271, and adder 269 perform a proportional integral calculation to cause DC component Itrdc to be 0 so as to generate duty difference command Ddif.

In the exemplary configuration of FIG. 7, comparators 260, 262, NAND circuit 264, and multiplier 266 constitute a dead band circuit. The dead band circuit assumes DC component Itrdc=0 (that is, DC component Itrdc is not included) when DC component Itrdc falls within a permissible range having upper limit value max and lower limit value min. Thus, duty difference command Ddif=0 is set. Therefore, each of duties d1, d2 is not changed from reference duty Dref=0.5. However, when an integrated value remains in integrator 271, duty difference command Ddif is not equal to 0 even if DC component Itrdc is equal to 0.

On the other hand, when DC component Itrdc falls out of the permissible range, duty difference command Ddif is generated based on DC component Itrdc. Therefore, duties d1, d2 are changed from reference duty Dref=0.5 in accordance with the formulas (1) and (2) (or the formulas (3) and (4)).

Referring back to FIG. 5, control signal generation unit 26 generates control signals S1 to S4 for primary side bridge circuit 3a and control signals S11 to S14 for secondary side bridge circuit 3b based on phase difference command value φ* generated by phase difference command generation unit 23 and duties d1, d2 generated by biased magnetization suppression control unit 24.

Driver 11a amplifies control signals S1 to S4 to generate gate signals, and supplies the gate signals to switching elements SW1 to SW4 of primary side bridge circuit 3a. Driver 11b amplifies control signals S11 to S14 to generate gate signals, and supplies the gate signals to secondary side bridge circuit 3b.

Primary side bridge circuit 3a switches the first switching element pair (switching elements SW1, SW4) and the second switching element pair (switching elements SW2, SW3) at duty d1. Accordingly, primary side bridge circuit 3a outputs primary side AC voltage Vtr1 having duty d1. Secondary side bridge circuit 3b switches the third switching element pair (switching elements SW11, SW14) and the second switching element pair (switching elements SW12, SW13) at duty d2. Accordingly, primary side bridge circuit 3a outputs secondary side AC voltage Vtr2 having duty d2.

Figure 8:
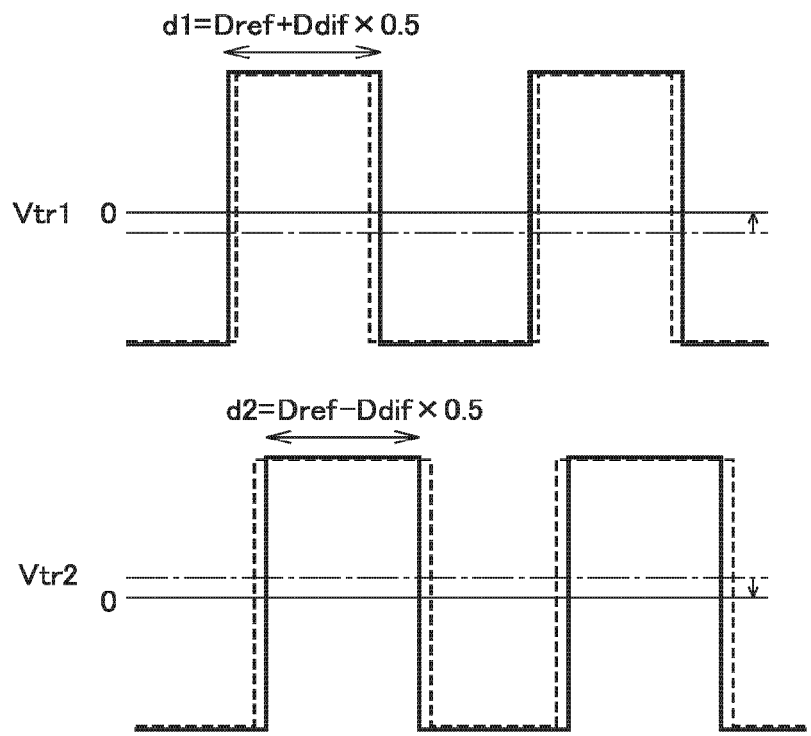
FIG. 8 is a diagram for illustrating changes in waveforms of the primary side AC voltage and the secondary side AC voltage due to a change in duty.

FIG. 8 is a diagram for illustrating changes in waveforms of primary side AC voltage Vtr1 and secondary side AC voltage Vtr2 due to a change in duty d.

When a DC component included in an AC voltage is a positive voltage, duty d is decreased. Accordingly, a positive potential period becomes relatively shorter than a negative potential period, with the result that a positive DC component is decreased.

On the other hand, when a DC component included in an AC voltage is a negative voltage, duty d is increased. Accordingly, a negative potential period becomes relatively shorter than a positive potential period, with the result that a negative DC component is decreased.

In the present embodiment, duty d1 is increased by Ddif×0.5 and duty d2 is decreased by Ddif×0.5 so as to match the difference between duty d1 and duty d2 with duty difference command Ddif.

Therefore, when duty difference command Ddif>0, as shown in FIG. 8, duty d1 is adjusted to decrease the negative DC component of primary side AC voltage Vtr1 and duty d2 is adjusted to decrease the positive DC component of secondary side AC voltage Vtr2. Accordingly, DC component Itrdc can be canceled.

As described above, according to power conversion device 100 according to the first embodiment, duty d in at least one of primary side AC voltage Vtr1 and secondary side AC voltage Vtr2 is changed to cancel DC component Itrdc included in the passing current in inductance element 2 (reactor 25). Accordingly, it is possible to suppress occurrence of DC biased magnetization in inductance element 2.

Second Embodiment

Figure 9:
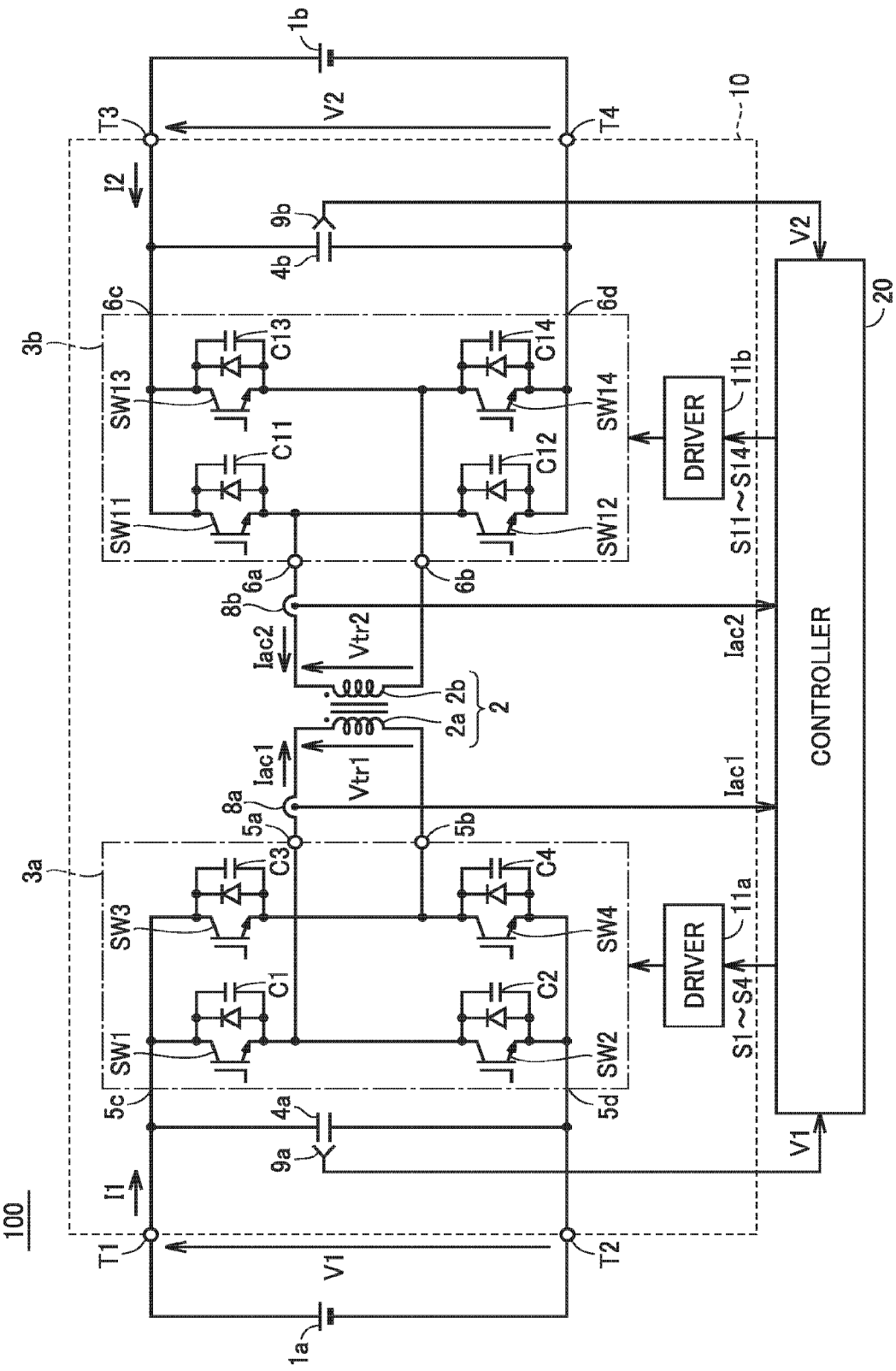
FIG. 9 is a schematic diagram of a main circuit of a power conversion device according to a second embodiment.

FIG. 9 is a schematic diagram of a main circuit of a power conversion device 100 according to a second embodiment. Power conversion device 100 according to the second embodiment differs from power conversion device 100 shown in FIG. 1 in terms of a configuration of inductance element 2.

Referring to FIG. 9, inductance element 2 is constituted of a transformer 2 having a primary winding 2a and a secondary winding 2b, which are insulated from each other. In the example of FIG. 9, a ratio of the number of turns of primary winding 2a and the number of turns of secondary winding 2b is 1:1. It should be noted that the transformer may employ a ratio of the numbers of turns other than the ratio of numbers of turns of 1:1.

One terminal of primary winding 2a is connected to AC terminal 5a of primary side bridge circuit 3a, and the other terminal of primary winding 2a is connected to AC terminal 5b of primary side bridge circuit 3a. One terminal of secondary winding 2b is connected to AC terminal 6a of secondary side bridge circuit 3b, and the other terminal of secondary winding 2b is connected to AC terminal 6b of secondary side bridge circuit 3b.

Figure 10:
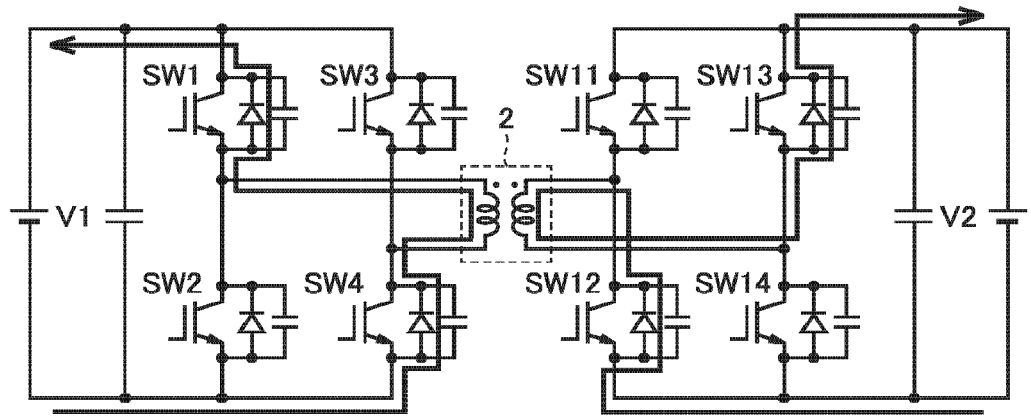
FIG. 10 is a diagram for illustrating a current path when power is transferred from DC power supply 1a to DC power supply 1b.
Figure 10:
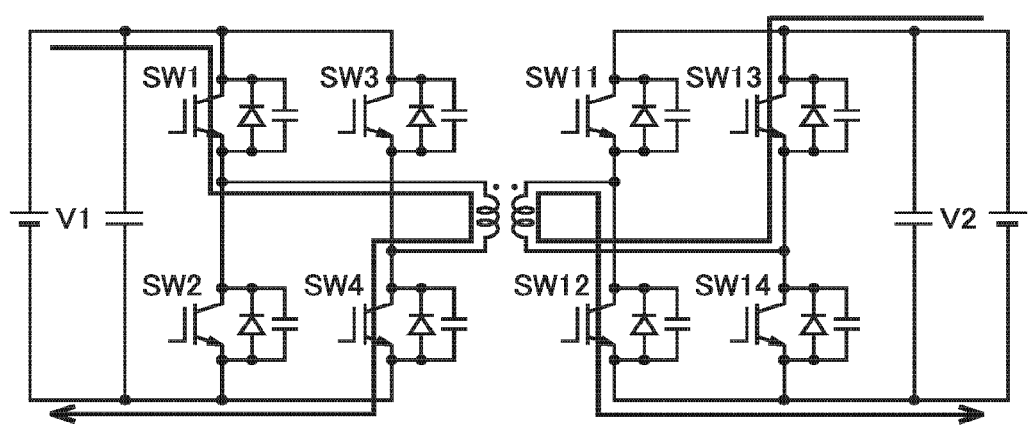
Figure 10:
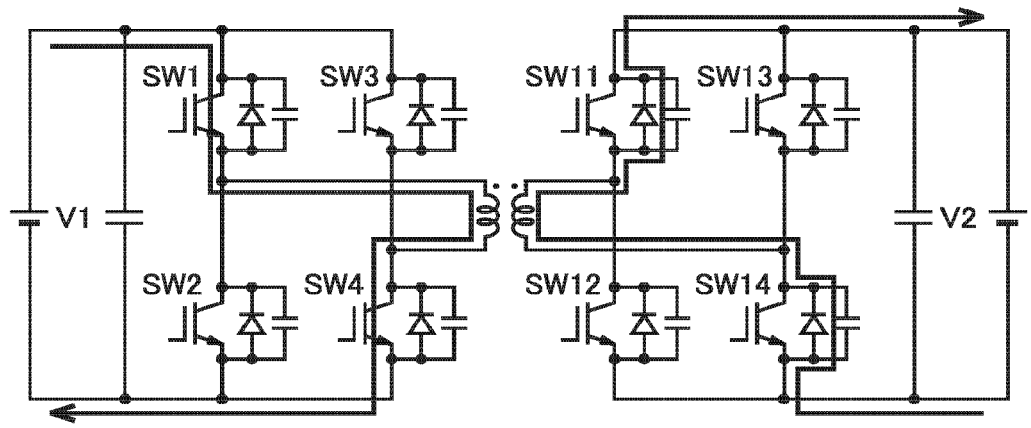
Figure 11:
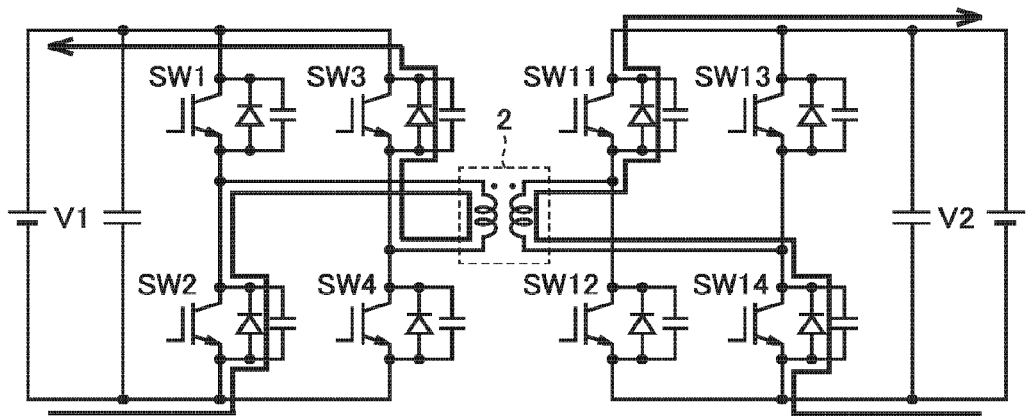
FIG. 11 is a diagram for illustrating a current path when power is transferred from DC power supply 1a to DC power supply 1b.
Figure 11:
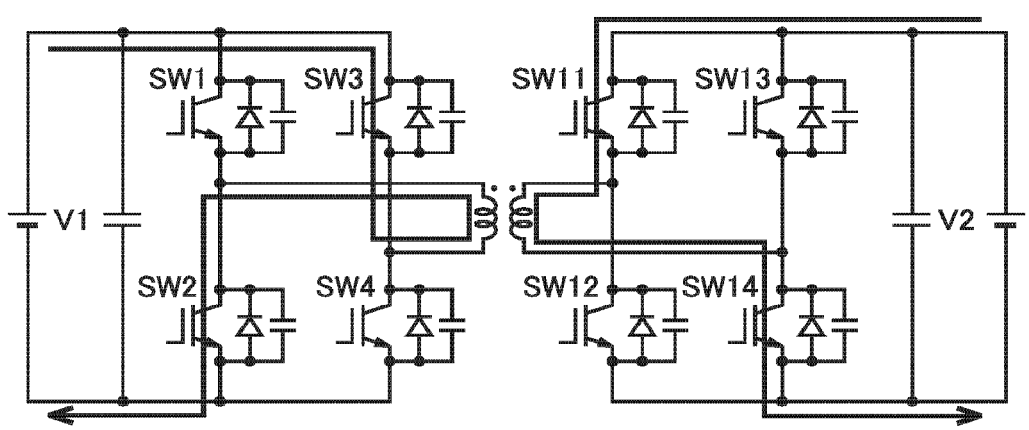
Figure 11:
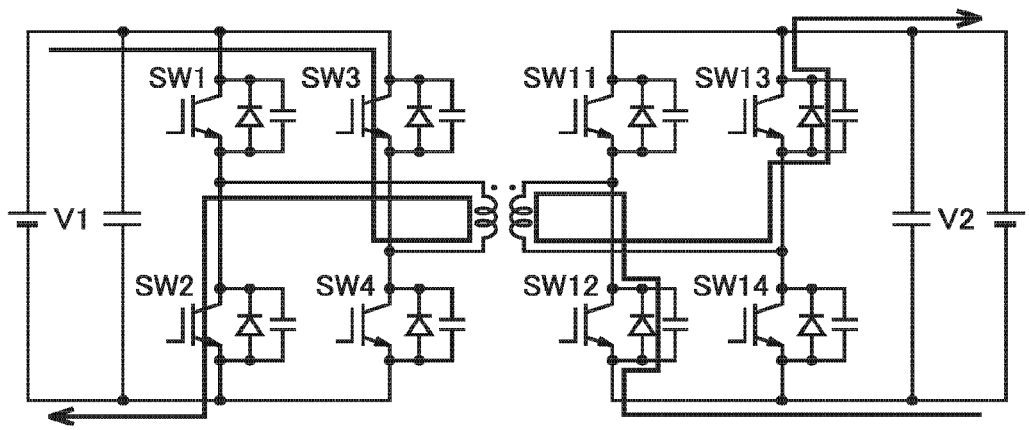

Next, the following describes an operation of power conversion device 100 according to the second embodiment with reference to FIG. 10 and FIG. 11.

Each of FIG. 10 and FIG. 11 is a diagram for illustrating a current path when power is transferred from DC power supply 1a to DC power supply 1b. It should be noted that the temporal changes of primary side AC voltage Vtr1, secondary side AC voltage Vtr2, primary side alternating current Iac1, and secondary side alternating current Iac2 in each of the states (A) to (F) of DC/DC converter 10 shown in FIG. 10 and FIG. 11 are basically the same as the temporal changes shown in FIG. 4.

FIG. 10 (A) shows a flow of current immediately after switching elements SW2, SW3 of primary side bridge circuit 3a are turned off and switching elements SW1, SW4 are turned on. Switching elements SW1, SW4, SW12, SW13 are in the ON state, and switching elements SW2, SW3, SW11, SW14 are in the OFF state. Since primary side alternating current Iac1 flows in a negative direction from primary winding 2a to primary side bridge circuit 3a before switching elements SW2, SW3 of primary side bridge circuit 3a are turned off and switching elements SW1, SW4 are turned on, primary side alternating current Iac1 continues to flow in the same direction. On this occasion, secondary side alternating current Iac2 continues to flow in the positive direction from secondary side bridge circuit 3b to secondary winding 2b.

After the state shown in FIG. 10 (A), a voltage is applied from DC power supply 1a to primary winding 2a to cause a current opposite to primary side alternating current Iac1, so that the magnitude of primary side alternating current Iac1 is decreased. Then, as shown in FIG. 10 (B), the direction of primary side alternating current Iac1 is reversed. In the states shown in FIG. 10 (A) and FIG. 10 (B), transformer 2 is excited.

After the state shown in FIG. 10 (B), in secondary side bridge circuit 3b, switching elements SW12, SW13 are turned off, and switching elements SW11, SW14 are turned on. A switching state of secondary side bridge circuit 3b is reversed to be a state shown in FIG. 10 (C). In the state shown in FIG. 10 (C), power is transferred from DC power supply 1a to DC power supply 1b.

After the state shown in FIG. 10 (C), in primary side bridge circuit 3a, switching elements SW1, SW4 are turned off and switching elements SW2, SW3 are turned on, thus resulting in a state shown in FIG. 11 (D). Since primary side alternating current Iac1 have flown in the positive direction from primary side bridge circuit 3a to primary winding 2a in the state shown in FIG. 10 (C), primary side alternating current Iac1 continues to flow in the same direction in the state shown in FIG. 11 (D). On this occasion, secondary side alternating current Iac2 continues to flow in the negative direction from secondary winding 2b to secondary side bridge circuit 3b.

After the state shown in FIG. 11 (D), a voltage is applied from DC power supply 1a to primary winding 2a to cause a current opposite to primary side alternating current Iac1, so that the magnitude of primary side alternating current Iac1 is decreased. Then, as shown in FIG. 11 (E), the direction of primary side alternating current Iac1 is reversed. In the states shown in FIG. 11 (D) and FIG. 11 (E), transformer 2 is excited.

After the state shown in FIG. 11 (E), in secondary side bridge circuit 3b, switching elements SW12, SW13 are turned on, and switching elements SW11, SW14 are turned off. A switching state of secondary side bridge circuit 3b is reversed to be a state shown in FIG. 11 (F). In the state shown in FIG. 11 (F), power is transferred from DC power supply 1a to DC power supply 1b. After the state shown in FIG. 11 (F), in primary side bridge circuit 3a, switching elements SW1, SW4 are turned on and switching elements SW2, SW3 are turned off, thus resulting in a state shown in FIG. 10 (A).

Also in DC/DC converter 10 according to the second embodiment, as with DC/DC converter 10 according to the first embodiment, the first leg including switching elements SW1, SW2 and the second leg including switching elements SW3, SW4 are switched basically at a phase difference of 180° in primary side bridge circuit 3a, whereas the third leg including switching elements SW11, SW12 and the fourth leg including switching elements SW13, SW14 are switched basically at a phase difference of 180° in secondary side bridge circuit 3b. In each bridge circuit, a phase difference can be provided between the switching operations of the two legs. By adjusting a phase difference φ in switching period between primary side bridge circuit 3a and secondary side bridge circuit 3b, power supplied from DC power supply 1a can be converted and then can be transferred to DC power supply 1b.

In DC/DC converter 10 according to the second embodiment, when primary side AC voltage Vtr1 is applied to primary winding 2a of transformer 2 to allow a current to flow through primary winding 2a and secondary winding 2b, a magnetic flux is generated in an iron core of transformer 2. When DC biased magnetization including a DC component is generated in the magnetic flux in the iron core, an excitation current of transformer 2 is increased, with the result that an overcurrent flows in transformer 2 to presumably result in damage of DC/DC converter 10.

To address this, in power conversion device 100 according to the second embodiment, duty d is changed in each of primary side AC voltage Vtr1 and secondary side AC side voltage Vtr2 so as to cancel the DC biased magnetization in transformer 2.

Figure 12:
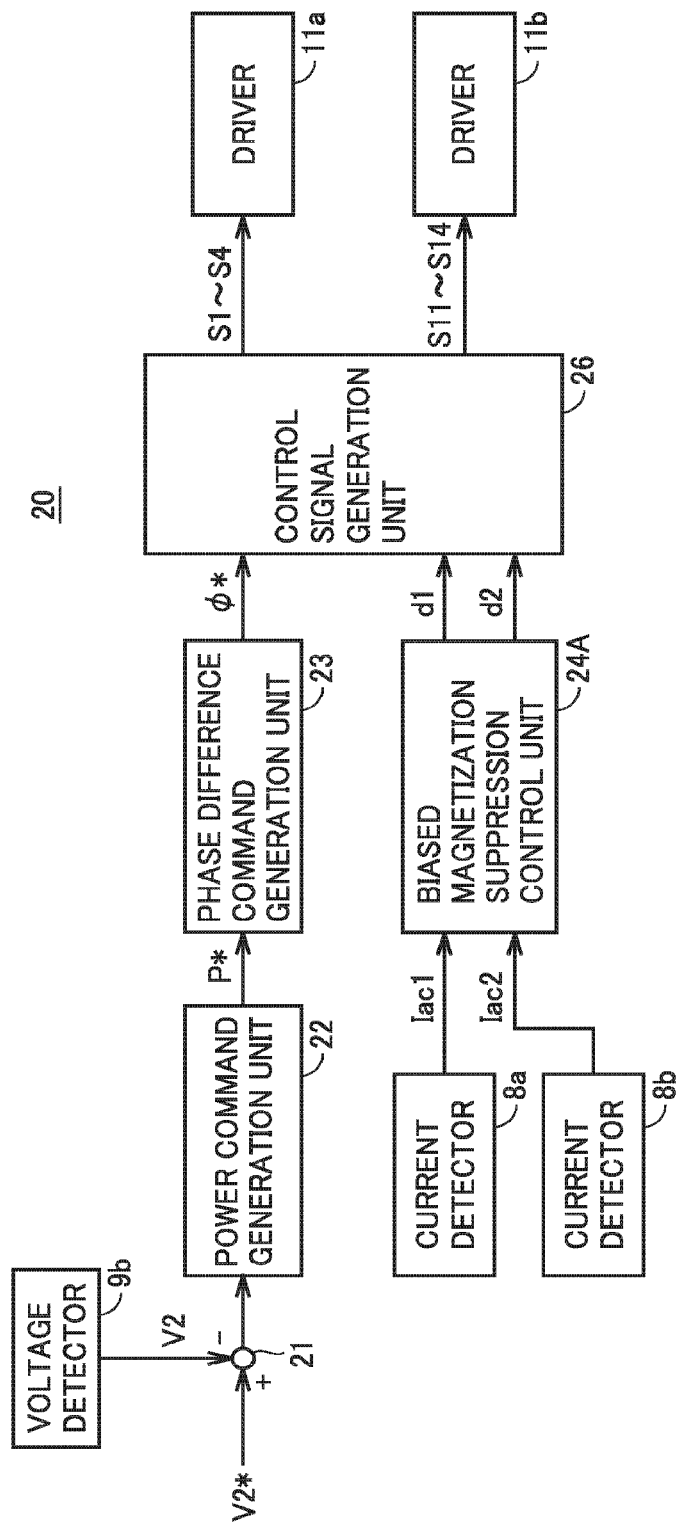
FIG. 12 is a block diagram showing portions of a controller associated with generation of control signals.

FIG. 12 is a block diagram showing portions of controller 20 shown in FIG. 9 and associated with generation of control signals S1 to S4 and S11 to S14. Functions of the blocks shown in FIG. 12 can be implemented by at least one of software processing by controller 20 and hardware processing.

Referring to FIG. 12, controller 20 differs from controller 20 shown in FIG. 5 in that it includes a biased magnetization suppression control unit 24A instead of biased magnetization suppression control unit 24.

Biased magnetization suppression control unit 24A generates duty d1 in primary side bridge circuit 3a and duty d2 in secondary side bridge circuit 3b based on primary side alternating current Iac1 detected by current detector 8a and secondary side alternating current Iac2 detected by current detector 8b.

Figure 13:
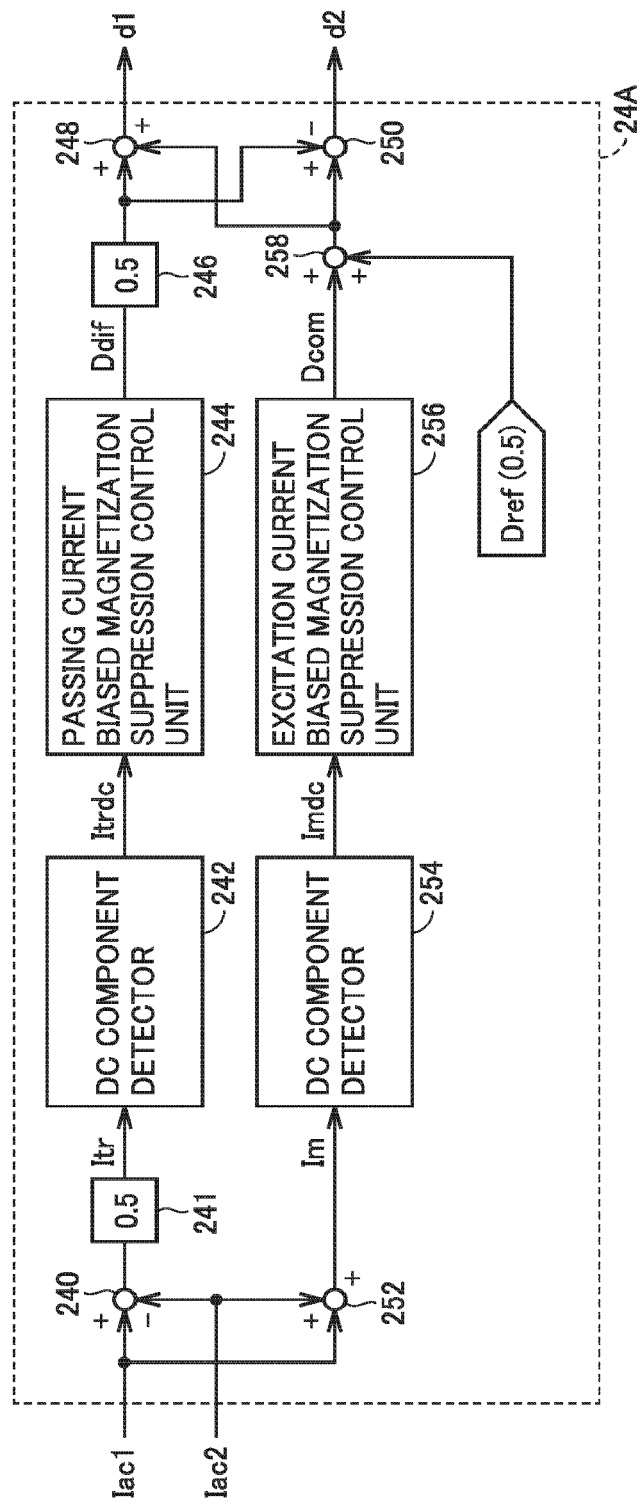
FIG. 13 is a block diagram showing a configuration of a biased magnetization suppression control unit shown in FIG. 12.

FIG. 13 is a block diagram showing a configuration of biased magnetization suppression control unit 24A shown in FIG. 12.

Referring to FIG. 13, biased magnetization suppression control unit 24A differs from biased magnetization suppression control unit 24 shown in FIG. 6 in that adders 252, 258, a DC component detector 254, and an excitation current biased magnetization suppression control unit 256 are added therein.

Adder 252 calculates a total (Iac1+Iac2) of primary side alternating current Iac1 detected by current detector 8a and secondary side alternating current Iac2 detected by current detector 8b. This total (Iac1+Iac2) corresponds to the excitation current of transformer 2 as shown in FIG. 14 (B).

Figure 14:
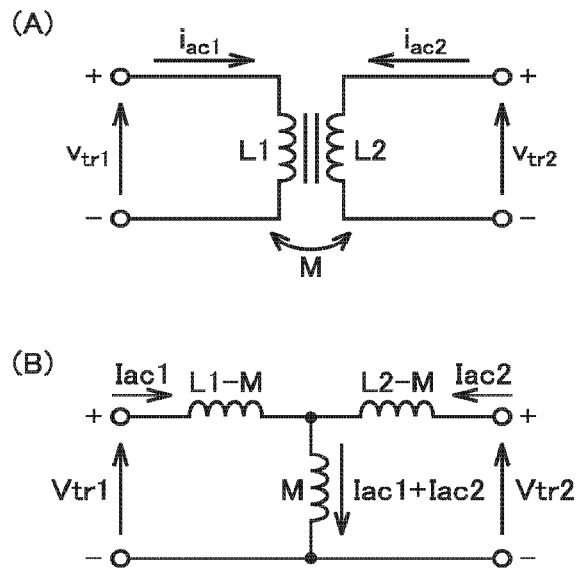
FIG. 14 shows circuit diagram and equivalent circuit diagram of a transformer.

FIG. 14 (A) is a circuit diagram of transformer 2. Since the primary winding and the secondary winding are magnetically coupled in transformer 2, the primary winding and the secondary winding are insulated from each other for direct current as shown in FIG. 14 (A). The circuit diagram in FIG. 14 (A) can be represented by an equivalent circuit as shown in FIG. 14 (B) in accordance with a relational formula for voltage and current.

Basic formulas of transformer 2 in FIG. 14 (A) are the following formulas (5) and (6). In the formulas, $L_1$ represents a self-inductance of the primary winding, $L_2$ represents a self-inductance of the secondary winding, and M represents a mutual inductance.

$$Vtr1 = j\omega L_1 Iac1 + j\omega M Iac2 \quad (5)$$

$$Vtr2 = j\omega L_2 Iac2 + j\omega M Iac1 \quad (6)$$

The formulas (5) and (6) can be modified into the following formulas (7) and (8).

$$Vtr1 = j\omega(L_1-M)Iac1 + j\omega M(Iac1+Iac2) \quad (7)$$

$$Vtr2 = j\omega(L_2-M)Iac2 + j\omega M(Iac1+Iac2) \quad (8)$$

In the formulas (7) and (8), Iac1+Iac2 corresponds to the excitation current of transformer 2. As with passing current Itr, when a DC component remains in AC voltage output to the AC terminal due to a variation in characteristics of the switching elements included in each bridge circuit or the like, a DC component may be included in the excitation current.

In the second embodiment, passing current Itr transferred from primary side bridge circuit 3a to secondary side bridge circuit 3b is detected by calculating the deviation (Iac1−Iac2) between primary side alternating current Iac1 detected by current detector 8a and secondary side alternating current Iac2 detected by current detector 8b, and excitation current Im of transformer 2 is detected by calculating the total (Iac1+Iac2) of primary side alternating current Iac1 and secondary side alternating current Iac2. Then, the DC component included in each of passing current Itr and excitation current Im is detected.

Specifically, as shown in FIG. 13, DC component detector 242 detects DC component Itrdc included in passing current Itr. DC component detector 254 detects DC component Imdc included in excitation current Im. DC component Itrdc corresponds to a "first DC component", and DC component Imdc corresponds to a "second DC component". Detailed configurations of DC component detectors 242, 254 will be described later.

Passing current biased magnetization suppression control unit 244 performs a control calculation to cause DC component Itrdc detected by DC component detector 242 to be 0 so as to generate a duty difference command Ddif. Multiplier 246 multiplies duty difference command Ddif by a coefficient of 0.5.

Excitation current biased magnetization suppression control unit 256 performs a control calculation to cause DC component Imdc detected by DC component detector 254 to be 0 so as to generate a "common duty command Dcom" for adjusting both duty d1 of primary side bridge circuit 3a and duty d2 of secondary side bridge circuit 3b. Common duty command Dcom corresponds to an embodiment of a "manipulation amount" for first duty d1 and second duty d2.

Adder 258 adds common duty command Dcom to reference duty Dref. Adder 248 adds an output (Ddif×0.5) of multiplier 246 to the output (Dref+Dcom) of adder 258, thereby generating duty d1.

Subtractor 250 subtracts the output (Ddif×0.5) of multiplier 246 from the output (Dref+Dcom) of adder 258, thereby generating duty d2.

Here, reference duty Dref=0.5 is set. Duties d1, d2 are respectively given by the following formulas (9) and (10):

$$d1 = 0.5 + Dcom + Ddif \times 0.5 \quad (9)$$

$$d2 = 0.5 + Dcom - Ddif \times 0.5 \quad (10)$$

As can be understood from the formulas (9) and (10), each of duties d1, d2 includes common duty command Dcom. A difference (d1−d2) between duty d1 and duty d2 is equal to duty difference command Ddif. It should be noted that as described in the first embodiment, a ratio of the added value for duty d1 and the subtracted value for duty d2 can be appropriately set. When the ratio of the added and subtracted values is k:(1−k) (where 0≤k≤1), duties d1, d2 are respectively given by the following formulas (11) and (12):

$$d1 = 0.5 + Dcom + Ddif \times k \quad (11)$$

$$d2 = 0.5 + Dcom - Ddif \times (1-k) \quad (12)$$

According to the formulas (11) and (12), Dref+Dcom can be set for one of duties d1, d2, and a value for the other of duties d1, d2 can be changed from Dref+Dcom by duty difference command Ddif.

Figure 15:
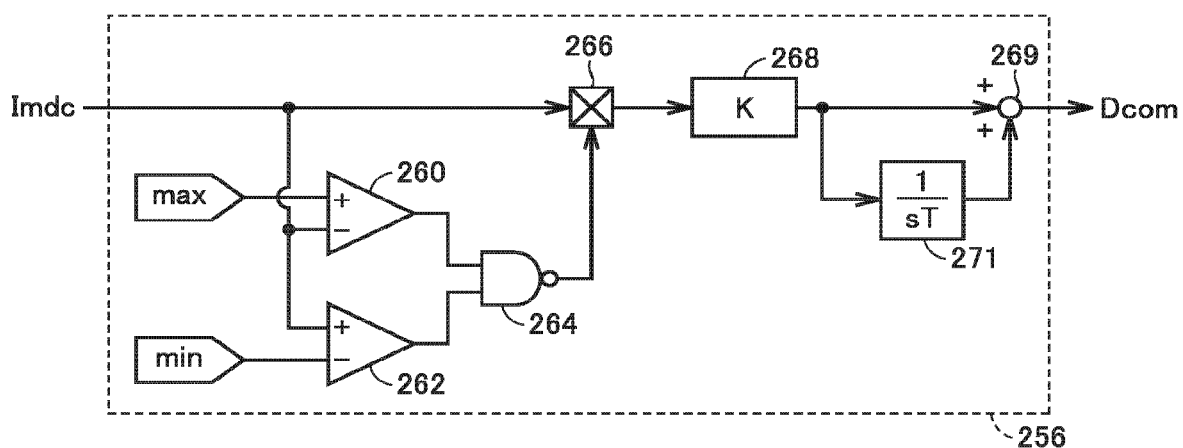
FIG. 15 is a block diagram showing a configuration of an excitation current biased magnetization suppression control unit shown in FIG. 13.

FIG. 15 is a block diagram showing a configuration of excitation current biased magnetization suppression control unit 256 shown in FIG. 13.

Referring to FIG. 15, excitation current biased magnetization suppression control unit 256 has the same circuit configuration as that of passing current biased magnetization suppression control unit 244 shown in FIG. 7. That is, excitation current biased magnetization suppression control unit 256 has a dead band circuit, and is configured to generate common duty command Dcom by performing a control calculation to cause DC component Imdc to be 0 when DC component Imdc of excitation current Im falls out of the permissible range.

Referring back to FIG. 12, control signal generation unit 26 generates control signals S1 to S4 for primary side bridge circuit 3a and control signals S11 to S14 for secondary side bridge circuit 3b based on phase difference command value φ* generated by phase difference command generation unit 23 and duties d1, d2 generated by biased magnetization suppression control unit 24A.

Driver 11a amplifies control signals S1 to S4 to generate gate signals, and supplies the gate signals to switching elements SW1 to SW4 of primary side bridge circuit 3a. Driver 11b amplifies control signals S11 to S14 to generate gate signals, and supplies the gate signals to secondary side bridge circuit 3b.

Primary side bridge circuit 3a switches the first switching element pair (SW1, SW4) and the second switching element pair (SW2, SW3) at duty d1. Accordingly, primary side bridge circuit 3a outputs primary side AC voltage Vtr1 having duty d1. Secondary side bridge circuit 3b switches the third switching element pair (SW11, SW14) and the fourth switching element pair (SW12, SW13) at duty d2. Accordingly, primary side bridge circuit 3a outputs secondary side AC voltage Vtr2 having duty d2.

As described above, according to power conversion device 100 according to the second embodiment, duty d in each of primary side AC voltage Vtr1 and secondary side AC voltage Vtr2 is changed to cancel the DC component included in each of passing current Itr and magnetizing current Im in inductance element 2 (transformer). Accordingly, it is possible to suppress occurrence of DC biased magnetization in inductance element 2 (transformer).

Third Embodiment

In power conversion device 100 according to each of the first and second embodiments, the transfer power between DC power supply 1a and DC power supply 1b can be adjusted by controlling phase difference φ between primary side AC voltage Vtr1 generated in primary side bridge circuit 3a and secondary side AC voltage Vtr1 generated in secondary side bridge circuit 3b.

In the third embodiment, the following describes a timing suitable to update phase difference command value φ* in order to suppress occurrence of DC biased magnetization in inductance element 2. It should be noted that the technique described in the third embodiment can be applied to each of power conversion devices 100 according to the first and second embodiments described above.

Figure 16:
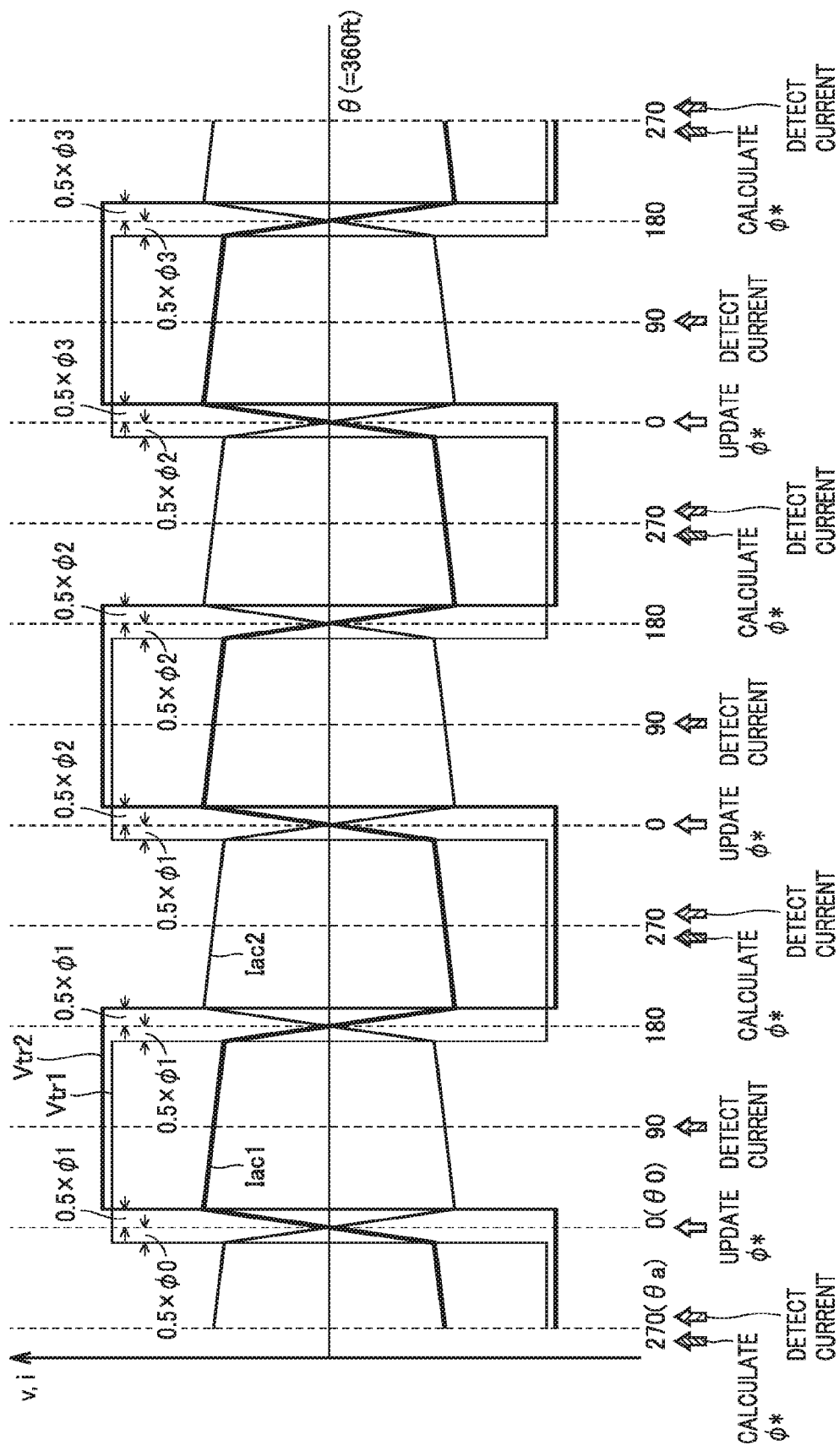
FIG. 16 is a diagram for illustrating a relation between each of a primary side AC voltage and a secondary side AC voltage and a switching carrier phase.

FIG. 16 is a diagram for illustrating a relation between each of primary side AC voltage Vtr1 and secondary side AC voltage Vtr2 and the switching carrier phase. In the present specification, for convenience of description, a timing at which each of Vtr1 and Vtr2 rises when phase difference command value ϕ*=0 and duty d1=d2=0.5 are satisfied is defined as "a switching carrier phase is θ0 (reference phase)". In the example of FIG. 16, θ0=0°.

A timing at which each of Vtr1 and Vtr2 falls is defined as "the switching carrier phase is θ0+180°". Further, a period until the switching carrier phase is changed from θ0 to θ0+360° (that is, next θ0) is defined as a "switching period".

It should be noted that on contrary to the above definitions, the timing at which each of Vtr1 and Vtr2 falls may be defined as "the switching carrier phase is θ0", and the timing at which each of Vtr1 and Vtr2 rises may be defined as "the switching carrier phase is θ0+180°". That is, the timing at which each of Vtr1 and Vtr2 is switched from a first polarity to a second polarity is defined as reference phase θ0.

In controller 20, when phase difference command value ϕ* is given, control signal generation unit 26 shifts the phase of primary side AC voltage Vtr1 by −0.5×ϕ* with respect to θ0 (reference phase). On the other hand, control signal generation unit 26 shifts the phase of secondary side AC voltage Vtr2 by +0.5×ϕ* with respect to θ0 (reference phase). Therefore, in primary side bridge circuit 3a, the switching operation is performed at the timing at which the switching carrier phase becomes θ0−0.5×ϕ*, whereas in secondary side bridge circuit 3b, the switching operation is performed at the timing at which the switching carrier phase becomes θ0+0.5×ϕ*.

In the third embodiment, phase difference command value ϕ* is updated at the timing at which the switching carrier phase becomes θ0 (reference phase). In the example of FIG. 16, since θ0=0°, phase difference command value ϕ* is updated when the phase is 0°.

By updating phase difference command value ϕ* at the timing at which the switching carrier phase becomes θ0 (reference phase), it is possible to suppress occurrence of biased magnetization due to a variation of phase difference ϕ. Thus, a period until the timing (θ0+360°) at which phase difference command ϕ* is updated next time corresponds to one switching period. In one switching period, two periods, i.e., the rising and falling of the current, involves the excitation mode. Since the earlier excitation mode is started before reference phase θ0, phase difference command value ϕ* is changed substantially by ½ of an amount of change of phase difference command value ϕ*. In the next excitation mode, phase difference command value ϕ* is further changed by ½ of the amount of change in phase difference command value ϕ*, with the result that phase difference command value ϕ* is changed by the amount of change in phase difference command value ϕ*. Since phase difference ϕ is changed stepwisely in this way, the DC component of the alternating current can be 0. Further, since phase difference ϕ is fixed during one switching period, an average value of alternating current during a period of time from θ0 of the switching period to θ0 of the next switching period in an ideal state, i.e., the DC component included in the alternating current can be 0.

Fourth Embodiment

In a fourth embodiment, an exemplary configuration of each of DC component detectors 242, 254 shown in FIG. 6 and FIG. 12 will be described.

Figure 17:
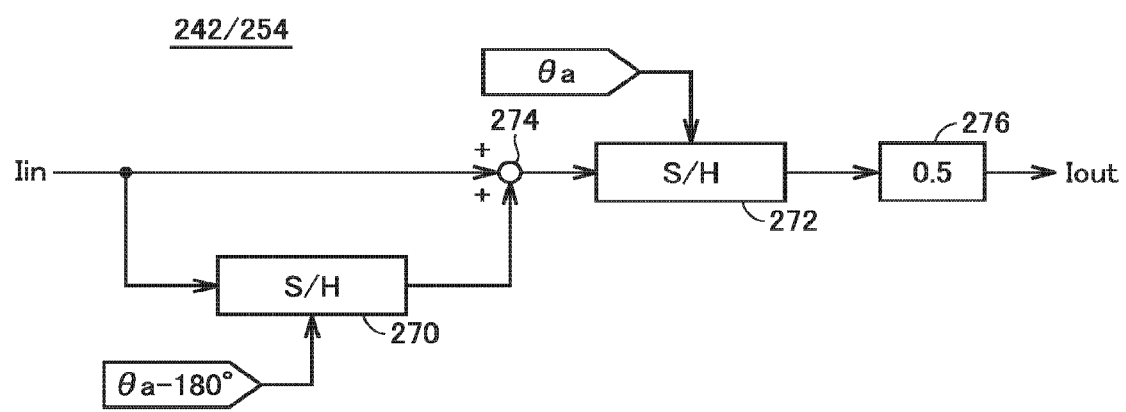
FIG. 17 is a block diagram showing a configuration of each of DC component detectors shown in FIG. 6 and FIG. 12.

FIG. 17 is a block diagram showing the configuration of each of DC component detectors 242, 254 shown in FIG. 6 and FIG. 12. It should be noted that DC component detector 242 and DC component detector 254 have the same circuit configuration, but are different from each other in terms of input and output currents. In FIG. 17, the input current is represented by Iin, and the output current is represented by Iout. In DC component detector 242, Iin=Itr and Iout=Itrdc are satisfied. In DC component detector 254, Iin=Im and Iout=Imdc are satisfied.

Referring to FIG. 17, the DC component detector includes sample/hold (S/H) circuits 270, 272, an adder 274, and a multiplier 276. The DC component detector is configured to calculate, for each switching period, a DC component included in input current Iin.

Specifically, sample/hold circuit 270 samples input current Iin at a timing at which the switching carrier phase becomes θa−180°, and temporarily holds it.

Adder 274 adds input current Iin and input current Iin held by sample/hold circuit 270.

Sample/hold circuit 272 samples an output signal of adder 278 at a timing at which the switching carrier phase becomes θa, and temporarily holds it. A current obtained by adding input current Iin at θa−180° to input current Iin is input to sample/hold circuit 272. By sampling this input current at the timing of θa, sample/hold circuit 272 outputs a current corresponding to a total of input current Iin when the switching carrier phase is θa−180° and input current Iin when the switching carrier phase is θa.

Multiplier 276 multiplies the output current of sample/hold circuit 272 by a coefficient of 0.5, and outputs a signal Iout indicating the multiplication result. Iout corresponds to a DC component included in input current Iin.

Sample/hold circuit 272 corresponds to one embodiment of a "first sample/hold circuit", sample/hold circuit 270 corresponds to one embodiment of a "second sample/hold circuit", and each of adder 278 and multiplier 276 corresponds to one embodiment of a "calculation unit".

Here, switching carrier phase θa (first phase) that determines the sampling timing of input current Iin can be appropriately set to fall within a range of more than θ0+180° and less than θ0+360° (θ0+180°<θa<θ0+360°). In the example of FIG. 16, θa=θ0+270° (i.e., 270°) is set. Therefore, in one switching period, input current Iin is sampled at each of the timing of θa (270°) and the timing of θa−180° (90°). Then, two input currents Iin sampled at these two timings are added to each other, and the addition result is multiplied by a coefficient of 0.5, whereby an average value of two input currents Iin can be substantially obtained. This average value corresponds to a DC component included in input current Iin.

When each of primary side alternating current Iac1 and secondary side alternating current Iac2 is positively and negatively symmetrical, each of passing current Itr (=Iac1−Iac2) and excitation current Im (=Iac1+Iac2) is also positively and negatively symmetrical. Therefore, the absolute value of the sampling value when the switching carrier phase is θa and the absolute value of the sampling value when the switching carrier phase is θa−180° are equal to each other, with the result that DC component Iout=0 is satisfied. DC component Iout represents the average value of these two sampling values.

On the other hand, when at least one of primary side alternating current Iac1 and secondary side alternating current Iac2 is positively and negatively asymmetrical, the absolute values of the two sampling values are different from each other. Hence, by averaging the two sampling values, DC component Iout can be detected.

As described above, according to the fourth embodiment, the DC component detector can be constituted of: two sample/hold circuits 270, 272, which are different from each other in the carrier phases of the sampling timings by 180°; and adder 274 and multiplier 276 each to calculate the average value of the two sampling values. Hence, a load required to detect the DC component can be reduced as compared with a configuration using a filter or the like. Therefore, the DC component included in input current Iin can be detected readily at a high speed.

It should be noted that the carrier phase (first phase) serving as the sampling timing can be appropriately set to fall within a range of more than θ0+180° and less than θ0+360°; however, it is preferable to detect input current Iin in the transfer mode in which a ratio of change of input current Iin is relatively smaller than that in the excitation mode, because a detection error can be made small.

In particular, when primary side AC voltage Vtr1 and secondary side AC voltage Vt2 are positively and negatively opposite to each other, the ratio of change of the current becomes large. Therefore, in order to detect the current at a center portion of a trapezoidal waveform, it is preferable to set θa to an appropriate phase falling within a range of more than θ0+180°+0.5×φmax and less than θ0+360°−0.5×φmax. It should be noted that φmax represents the maximum value of phase difference command value φ*.

Fifth Embodiment

In the third embodiment, as the timing suitable to update phase difference command value φ*, the following configuration has been described: phase difference command value φ* is updated when the switching carrier phase is φ0. In a fifth embodiment, the following configuration will be described: phase difference command value φ* is updated before the switching carrier phase is θ0.

Figure 18:
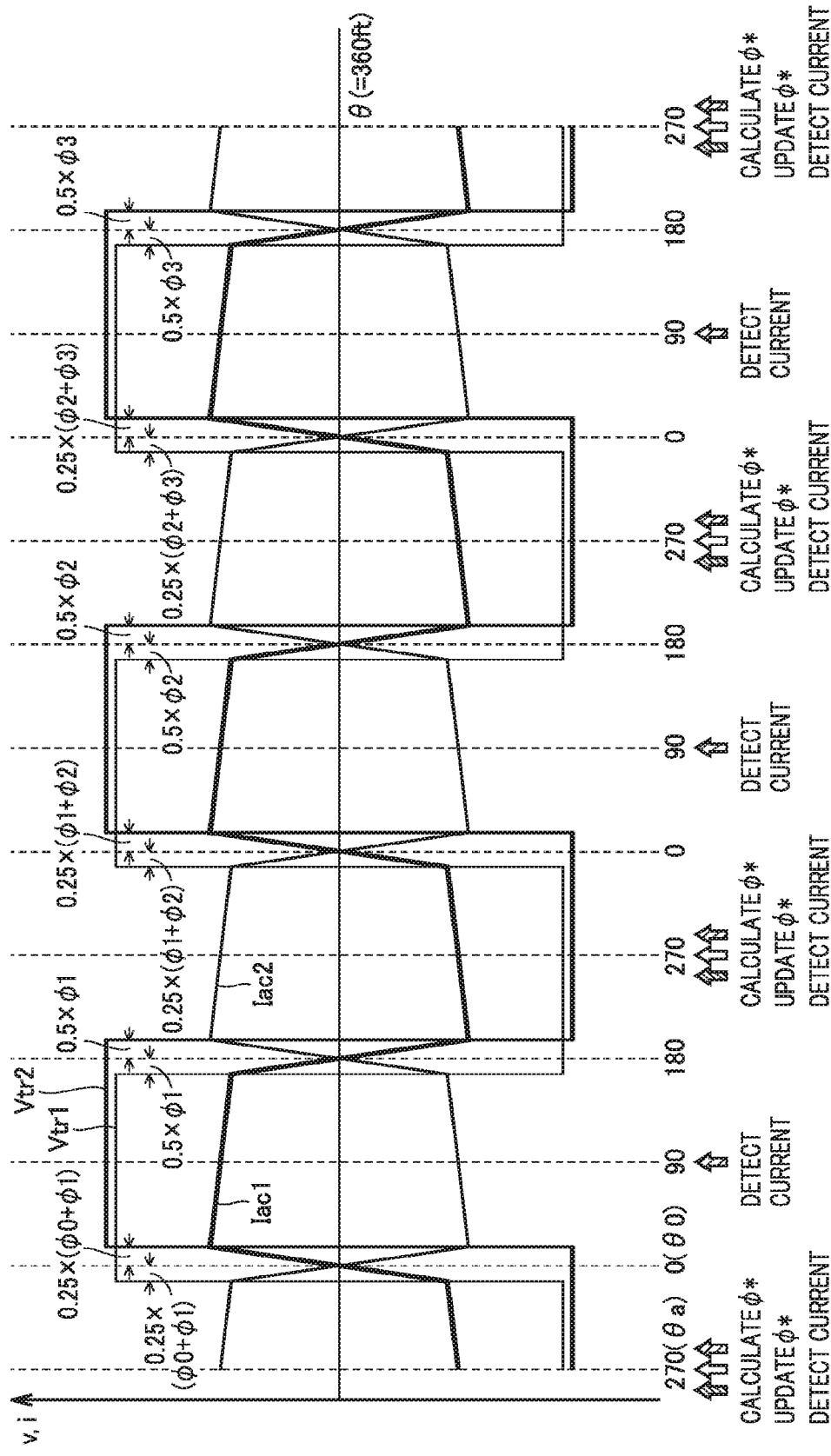
FIG. 18 is a diagram for illustrating a relation between each of a primary side AC voltage Vtr1 and a secondary side AC voltage Vtr2 and a switching carrier phase.

FIG. 18 is a diagram for illustrating a relation between each of primary side AC voltage Vtr1 and secondary side AC voltage Vtr2 and the switching carrier phase. In FIG. 18, as with FIG. 16, a timing at which each of Vtr1 and Vtr2 rises when phase difference command value φ*=0 and duty d1=d2=0.5 are satisfied is defined as "a switching carrier phase is θ0". In the example of FIG. 18, θ0=0°.

Referring to FIG. 18, in the fifth embodiment, phase difference command value φ* is updated at a timing earlier than the timing at which the switching carrier phase becomes θ0. The timing at which phase difference command value φ* is updated is set to a timing at which the switching carrier phase falls within a range of more than or equal to carrier phase θa (first phase) at which the input current is sampled and less than or equal to θ0+360°−0.5×φmax.

In the example of FIG. 18, the timing at which phase difference command value φ* is updated is the same timing as each of the timing at which the input current is sampled and the timing at which phase difference command value φ* is calculated in DC component detectors 242, 254. That is, phase difference command value φ* is updated at the timing at which the carrier phase becomes θa. It should be noted that in the example of FIG. 18, phase difference command value φ* is updated at θa (270°).

As shown in FIG. 18, when the switching carrier phase becomes θ0 after phase difference command value φ* is updated, control signal generation unit 26 shifts the phase of primary side AC voltage Vtr1 with respect to θ0 by −0.25× (phase difference command value φ* after the update+phase difference command value φ* before the update). On the other hand, control signal generation unit 26 shifts the phase of secondary side AC voltage Vtr2 with respect to θ0 by +0.25×(updated phase difference command value φ*+phase difference command value φ* before the update). That is, when the switching carrier phase becomes θ0 immediately after phase difference command value φ* is updated, control signal generation unit 26 replaces the half of the amount of shift of the phase difference with updated phase difference command value φ*.

Then, when the switching carrier phase becomes θ0+180°, control signal generation unit 26 shifts the phase of primary side AC voltage Vtr1 with respect to θ0 by −0.5× (updated phase difference command value φ*, and shifts the phase of secondary side AC voltage Vtr2 with respect to θ0 by +0.5× (updated phase difference command value φ*). That is, when the switching carrier phase becomes θ0+180°, the amount of shift of the phase difference is entirely replaced with updated phase difference command value φ*. It should be noted that the timing at which the amount of shift of the phase difference is entirely replaced with updated phase difference command value φ* is set to a timing at which the switching carrier phase falls within a range of more than or equal to θ0+0.5φmax and less than or equal to θ0+180°−0.5φmax.

In this way, even when the timing at which phase difference command value φ* is updated is earlier than the timing at which the switching carrier phase becomes θ0, phase difference command value φ* is changed by the half of the amount of change of updated phase difference command value φ* with respect to phase difference command value φ* before the update during the period in which the current is switched from the first polarity to the second polarity, and then phase difference command value φ* is changed by the rest of the amount of change of updated phase difference command value φ* during the period in which the current is switched from the second polarity to the first polarity. Accordingly, phase difference command value φ* corresponds to updated phase difference command value φ*. Accordingly, as with the third embodiment, it is possible to suppress occurrence of DC biased magnetization due to a variation in phase difference φ.

Further, by updating phase difference φ stepwisely in the first half period and the latter half period of one switching period, a difference can be made small between phase difference φ in the first half period and phase difference φ in the latter half period. As a result, in an ideal state, the average value of the alternating current, i.e., the DC component included in the alternating current, during a period of time from θ0 of the switching period to θ0 of the next switching period can be 0.

Sixth Embodiment

In power conversion device 100 according to each of the first and second embodiments, DC/DC converter 10 has one stage; however, DC/DC converter 10 having multiple stages can be implemented by using multiple transformers for inductance element 2.

Figure 19:
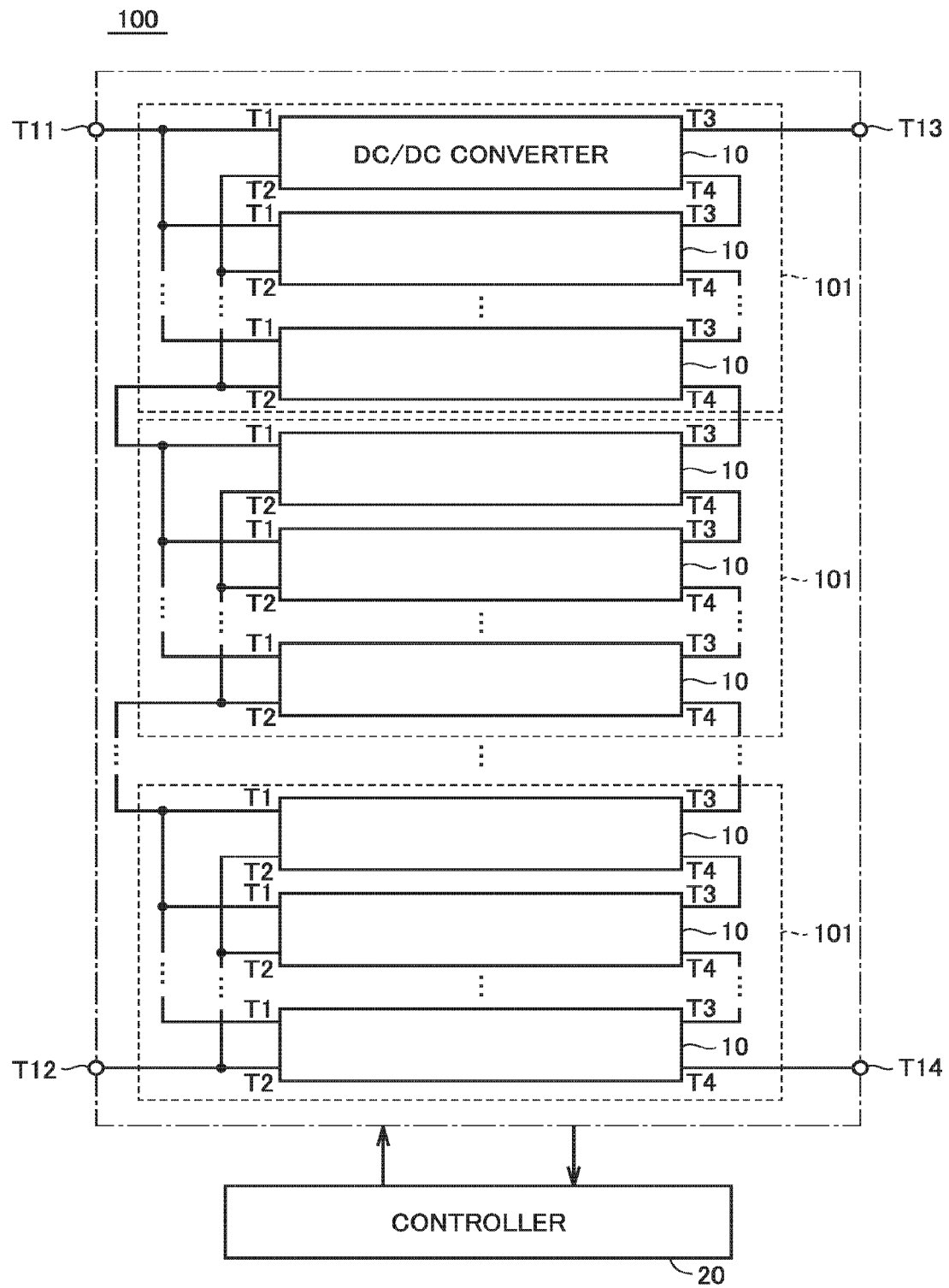
FIG. 19 is a schematic diagram of a main circuit of a power conversion device according to a sixth embodiment.

FIG. 19 is a schematic diagram of a main circuit of a power conversion device 100 according to a sixth embodiment.

Referring to FIG. 19, power conversion device 100 according to the sixth embodiment includes m (m is an integer of more than or equal to 2) power conversion units 101 and a controller 20. In the following description, it is assumed that first to m-th power conversion units 101 are arranged in this order.

Each of power conversion units 101 has n (n is an integer of more than or equal to 1) DC/DC converters 10. In the following description, it is assumed that first to n-th DC/DC converters 10 are arranged in this order. That is, power conversion device 100 according to the sixth embodiment includes m×n DC/DC converters 10.

In each power conversion unit 101, inn DC/DC converters 10, primary side bridge circuits 3a are connected to each other in parallel, and secondary side bridge circuits 3b are connected to each other in series. The parallel circuit of n primary side bridge circuits 3a is connected, in series, to the parallel circuit of n primary side bridge circuits 3a in an adjacent power conversion unit 101. The series circuit of n secondary side bridge circuits 3b is connected, in series, to the series circuit of n secondary side bridge circuits 3b in an adjacent power conversion unit 101.

DC terminal T1 of DC/DC converter 10 in first power conversion unit 101 is connected to DC terminal T11 of power conversion device 100, and DC terminal T2 of DC/DC converter 10 in m-th power conversion unit 101 is connected to DC terminal T12 of power conversion device 100.

DC terminal T3 of first DC/DC converter 10 in first power conversion unit 101 is connected to DC terminal T13 of power conversion device 100, and DC terminal T4 of n-th DC/DC converter 10 in m-th power conversion unit 101 is connected to DC terminal T14 of power conversion device 100.

Power conversion device 100 can perform bidirectional power conversion between DC voltage (primary side DC voltage) between DC terminals T11, T12 and DC voltage (secondary side DC voltage) between DC terminals T13, T14.

In each DC/DC converter 10, primary side bridge circuit 3a switches a first switching pair including switching elements SW1, SW4 and a second switching pair including switching elements SW2, SW3 at a phase difference of 180°. Secondary side bridge circuit 3b switches a third switching pair including switching elements SW11, SW14 and a fourth switching pair including switching elements SW12, SW13 at a phase difference of 180°. By adjusting a phase difference in switching period between primary side bridge circuit 3a and secondary side bridge circuit 3b, power supplied from the DC power supply at the primary side can be converted and then can be transferred to the DC power supply at the secondary side.

When inductance element 2 is reactor 25, controller 20 detects a DC component (first DC component) included in passing current Itr of transformer 2 of each DC/DC converter 10, and changes the duty of at least one of primary side AC voltage Vtr1 and secondary side AC voltage Vtr2 so as to cancel the detected DC component.

When inductance element 2 is a transformer, controller 20 detects a DC component (first DC component) of passing current Itr of transformer 2 of each DC/DC converter 10 and a DC component (second DC component) included in excitation current Im, and changes duties d1, d2 in primary side AC voltage Vtr1 and secondary side AC voltage Vtr2 so as to cancel the detected DC components.

With such a configuration, it is possible to suppress occurrence of DC biased magnetization in inductance element 2 included in each DC/DC converter 10. Hence, it is possible to suppress occurrence of DC biased magnetization in the whole of power conversion device 100.

It should be noted that at the time of filing, it has been initially expected to combine appropriately the configurations described in the above-described first to sixth embodiments so as to include combinations not mentioned in the specification unless they are inconsistent or contradictory.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1a, 1b: DC power supply; 2: inductance element (transformer); 3a: primary side bridge circuit; 3b: secondary side bridge circuit; 4a, 4b: capacitor; 5a, 5b, 6a, 6b: AC terminal; 5c, 5d, 6c, 6d, T1 to T4, T11 to T14: DC terminal; 8a, 8b: current detector; 9a, 9b: voltage detector; 10: DC/DC converter; 11a, 11b: driver; 20: controller; 21, 240, 250: subtractor; 22: power command generation unit; 23: phase difference command generation unit; 24, 24A: biased magnetization suppression control unit; 25: reactor; 26: control signal generation unit; 100: power conversion device; 101: power conversion unit; 242, 254: DC component detector; 244: passing current biased magnetization suppression control unit; 241, 246, 266, 276: multiplier; 248, 252, 258, 269, 274, 278: adder; 256: excitation current biased magnetization suppression control unit; 260, 262: comparator; 264: NAND circuit; 270, 272: sample/hold circuit; 268: proportional unit; 271: integrator; C1 to C4, C11 to C14: capacitor; SW1 to SW4, SW11 to SW14: switching element; d1, d2: duty; Ddif: duty difference command; Dcom: common duty command; Dref: reference duty; $\phi$: phase difference; $\phi^*$: phase difference command value; S1 to S4, S11 to S14: control signal; Itr: passing current; Im: excitation current.

The invention claimed is:

1. A power conversion device for performing power conversion between a first DC voltage and a second DC voltage, the power conversion device comprising:
a first bridge circuit to convert the first DC voltage into a first AC voltage and output the first AC voltage to a first AC terminal;
a second bridge circuit to convert the second DC voltage into a second AC voltage and output the second AC voltage to a second AC terminal;
an inductance element connected between the first AC terminal and the second AC terminal; and
a controller to control the voltage conversion in each of the first and second bridge circuits, wherein
the controller calculates a passing current passing through the inductance element based on a difference between a first alternating current flowing between the first AC terminal and the inductance element and a second alternating current flowing between the second AC terminal and the inductance element,
the controller detects a first DC component included in the passing current, and
the controller changes duties in the first AC voltage and the second AC voltage to cancel the detected first DC component, the duty being a ratio of a positive potential period and a negative potential period.

2. The power conversion device according to claim 1, wherein
the controller sets a target deviation between a first duty of the first AC voltage and a second duty of the second AC voltage by performing a control calculation to cause the first DC component to be 0, and the controller changes at least one of the first duty and the second duty to match a deviation between the first duty and the second duty with the target deviation.

3. The power conversion device according to claim 2, wherein the controller sets the first duty to a value obtained by adding, to a reference duty, a value obtained by multiplying the target deviation by k (0≤k≤1), and the controller sets the second duty to a value obtained by subtracting, from the reference duty, a value obtained by multiplying the target deviation by (1−k).

4. A power conversion device for performing power conversion between a first DC voltage and a second DC voltage, the power conversion device comprising:

a first bridge circuit to convert the first DC voltage into a first AC voltage and output the first AC voltage to a first AC terminal;

a second bridge circuit to convert the second DC voltage into a second AC voltage and output the second AC voltage to a second AC terminal;

an inductance element connected between the first AC terminal and the second AC terminal; and a controller to control the voltage conversion in each of the first and second bridge circuits, wherein the controller calculates a passing current passing through the inductance element based on a difference between a first alternating current flowing between the first AC terminal and the inductance element and a second alternating current flowing between the second AC terminal and the inductance element, the controller detects a first DC component included in the passing current, and the controller changes a duty in at least one of the first AC voltage and the second AC voltage to cancel the detected first DC component, the duty being a ratio of a positive potential period and a negative potential period, wherein the inductance element is a reactor having a first terminal connected to the first AC terminal and a second terminal connected to the second AC terminal.

5. A power conversion device for performing power conversion between a first DC voltage and a second DC voltage, the power conversion device comprising:

a first bridge circuit to convert the first DC voltage into a first AC voltaic and output the first AC voltage to a first AC terminal;

a second bridge circuit to convert the second DC voltage into a second AC voltage and output the second AC voltage to a second AC terminal, an inductance element connected between the first AC terminal and the second AC terminal; and a controller to control the voltage conversion in each of the first and second bridge circuits, wherein the controller calculates a passive current passing through the inductance element based on a difference between a first alternating current flowing between the first AC terminal and the inductance element and a second alternating current flowing between second AC terminal and the inductance element, the controller detects a first DC component included in the passing current, the controller changes a duty in at least one of the first AC voltage and the second AC voltage to cancel the detected first DC component, the duty being a ratio of a positive potential period and a negative potential period, the inductance element is a transformer having a primary winding to receive the first AC voltage from the first AC terminal and a secondary winding to receive the second AC voltage from the second AC terminal, the controller calculates an excitation current of the transformer based on a total of the first alternating current flowing between the first AC terminal and the primary winding and the second alternating current flowing between the second AC terminal and the secondary winding, the controller detects a second DC component included in the excitation current, and the controller changes the duties in the first AC voltage and the second AC voltage to cancel the first DC component and the second DC component.

6. The power conversion device according to claim 5, wherein the controller sets a target deviation between a first duty of the first AC voltage and a second duty of the second AC voltage by performing a control calculation to cause the first DC component to be 0, and the controller sets a manipulation amount for the first duty and the second duty by performing a control calculation to cause the second DC component to be 0, the controller changes the first duty and the second duty in accordance with the set manipulation amount, and the controller changes at least one of the first duty and the second duty to match a deviation between the first duty and the second duty with the target deviation.

7. The power conversion device according to claim 6, wherein the controller sets the first duty to a value obtained by adding, to a reference duty, the manipulation amount and a value obtained by multiplying the target deviation by k (0≤k≤1), and the controller sets the second duty to a value obtained by subtracting, from a value obtained by adding the manipulation amount to the reference duty, a value obtained by multiplying the target deviation by (1−k).

8. A power conversion device for performing power conversion between a first DC voltage and a second DC voltage the power conversion device comprising:

a first bridge circuit to convert the first DC voltage into a first AC voltage and output the first AC voltage to a first AC terminal:

a second bridge circuit to convert the second DC voltage into a second AC voltage and output the second AC voltage to a second AC terminal;

an inductance element connected between the first AC terminal and the second AC terminal; and, a controller to control the voltage conversion in each of the first and second bridge circuits, wherein the controller calculates a passing current passing through the inductance element based on a difference between a first alternating current flowing between the first AC terminal and the inductance element and a second alternating current flowing between the second AC terminal and the inductance element, the controller detects a first DC component included in the passing current, the controller changes a duty in at least one of the first AC voltage and the second AC voltage to cancel the detected first DC component, the duty being a ratio of a positive potential period and a negative potential period, the controller sets, to a reference phase $\theta_0$ for a carrier phase, a timing at which the first AC voltage and the second AC voltage are switched from a first polarity to a second polarity when a phase difference command value between the first AC voltage and the second AC voltage is 0°, and the controller sets, to a switching period, a period until the carrier phase is changed from $\theta_0$ to $\theta_0+360°$.

9. The power conversion device according to claim 8, wherein the controller includes a DC component detector to detect a DC component included in an input current, the DC component detector includes a first sample/hold circuit to sample the input current at a timing at which the carrier phase becomes a first phase, and hold the input current, a second sample/hold circuit to sample the input current at a timing at which the carrier phase becomes a phase obtained by subtracting 180° from the first phase, and hold the input current, the first phase being set to fall within a range of more than $\theta_0+180°$ and less than $\theta_0+360°$, and a calculation unit to detect the DC component by calculating an average value of the input current held by the first sample/hold circuit and the input current held by the second sample/hold circuit.

10. The power conversion device according to claim 9, wherein when a maximum value of the phase difference command value is represented by $\varphi max$, the first phase is set to fall within a range of more than $\theta_0+180°+0.5\times\varphi max$ and less than $\theta_0+360°-0.5\times\varphi max$.

11. The power conversion device according to claim 8, wherein the controller updates the phase difference command value at a timing at which the carrier phase becomes the reference phase $\theta_0$.

12. The power conversion device according to claim 9, wherein the controller updates the phase difference command value at a timing at which the carrier phase becomes more than or equal to the first phase and less than or equal to $\theta_0+360°-0.5\times\varphi max$, at a timing at which the carrier phase becomes $\theta_0$ immediately after updating the phase difference command value, the controller replaces, with the updated phase difference command value, a half of a phase shift amount that is based on a previous phase difference command value, and at a timing at which the carrier phase becomes more than or equal to $\theta_0+0.5\varphi max$ and less than or equal to $\theta_0+180°-0.5\varphi max$, the controller sets the phase shift amount based on the updated phase difference command value.

13. The power conversion device according to claim 9, wherein the controller updates the phase difference command value at a timing at which the carrier phase becomes the reference phase $\theta_0$.

14. The power conversion device according to claim 10, wherein the controller updates the phase difference command value at a timing at which the carrier phase becomes the reference phase $\theta_0$.

15. The power conversion device according to claim 10, wherein the controller updates the phase difference command value at a timing at which the carrier phase becomes more than or equal to the first phase and less than or equal to $\theta_0+360°-0.5\times\varphi max$, at a timing at which the carrier phase becomes $\theta_0$ immediately after updating the phase difference command value, the controller replaces, with the updated phase difference command value, a half of a phase shift amount that is based on a previous phase difference command value, and at a timing at which the carrier phase becomes more than or equal to $\theta_0+0.5\varphi max$ and less than or equal to $\theta_0+180°-0.5\varphi max$, the controller sets the phase shift amount based on the updated phase difference command value.

* * * * *